United States Patent
Bonche et al.

(10) Patent No.: US 10,598,566 B2
(45) Date of Patent: *Mar. 24, 2020

(54) OPTICAL TIME-DOMAIN REFLECTOMETER DEVICE INCLUDING COMBINED TRACE DISPLAY

(71) Applicant: Viavi Solutions France SAS, Plaisir (FR)

(72) Inventors: Jean Paul Bonche, Saint Heand (FR); Olivier Receveur, Saint Marcellin en Forez (FR)

(73) Assignee: VIAVI SOLUTIONS FRANCE SAS, Plaisir (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,215

(22) Filed: Sep. 4, 2018

(65) Prior Publication Data

US 2018/0372581 A1 Dec. 27, 2018

Related U.S. Application Data

(63) Continuation of application No. 15/862,526, filed on Jan. 4, 2018, now Pat. No. 10,101,240.

(30) Foreign Application Priority Data

Apr. 27, 2017 (FR) ...................................... 17 53714

(51) Int. Cl.
*G01M 11/00* (2006.01)
*H04B 10/071* (2013.01)

(52) U.S. Cl.
CPC .... *G01M 11/3145* (2013.01); *G01M 11/3109* (2013.01); *H04B 10/071* (2013.01)

(58) Field of Classification Search
CPC . H04B 10/071; G01M 11/31; G01M 11/3109; G01M 11/3118; G01M 11/3127;
(Continued)

(56) References Cited

U.S. PATENT DOCUMENTS 4,104,582 A 8/1978 Lambertsen
4,397,551 A 8/1983 Bage et al.
(Continued)

FOREIGN PATENT DOCUMENTS

GB 2182222 1/1990
JP 2016-053542 A 4/2016
(Continued)

OTHER PUBLICATIONS

Reunert, M., "OTDR: Characterizing a fiberoptic network". Fiberoptic Product News; Dec. 2001, 3 pages.
(Continued)

*Primary Examiner* — Gordon J Stock, Jr.
(74) *Attorney, Agent, or Firm* — Mannava & Kang, P.C.

(57) ABSTRACT

In some examples, an optical time-domain reflectometer (OTDR) device may include a laser source to emit a plurality of laser beams. Each laser beam may include a different pulse width. A control unit may analyze, for each laser beam, a backscattered signal from a device under test (DUT). The control unit may generate, for each backscattered signal, a trace along the DUT. Further, the control unit may generate, based on an analysis of each trace along the DUT, a combined trace that identifies optical events detected along the DUT.

18 Claims, 21 Drawing Sheets

(58) Field of Classification Search
CPC ......... G01M 11/3136; G01M 11/3145; G01M 11/3154; G01M 11/3163; G01M 11/3172; G01M 11/3181; G01M 11/319
USPC ........................................................ 356/73.1
See application file for complete search history.

(56) References Cited

U.S. PATENT DOCUMENTS

| | | | |
|---|---|---|---|
| 4,812,038 A * | 3/1989 | Nazarathy | G01M 11/3118 356/73.1 |
| 4,823,166 A | 4/1989 | Hartog et al. | |
| 5,066,118 A | 11/1991 | Buerli | |
| 5,069,544 A | 12/1991 | Buerli | |
| 5,129,722 A * | 7/1992 | Mader | G01M 11/3145 345/157 |
| 5,155,439 A | 10/1992 | Holmbo et al. | |
| 5,365,328 A * | 11/1994 | Anderson | G01M 11/3109 356/73.1 |
| 5,450,191 A | 9/1995 | Parks et al. | |
| 5,479,251 A | 12/1995 | Hanson | |
| 5,528,356 A | 6/1996 | Harcourt | |
| 5,534,994 A | 7/1996 | Hanson et al. | |
| 5,708,500 A | 1/1998 | Anderson | |
| 6,674,518 B1 | 1/2004 | Asher et al. | |
| 6,710,862 B1 | 3/2004 | Wilson et al. | |
| 6,781,678 B2 | 8/2004 | Aoki et al. | |
| 7,256,878 B1 | 8/2007 | Asher et al. | |
| 8,222,906 B2 | 7/2012 | Wyar et al. | |
| 8,576,389 B2 | 11/2013 | Perron et al. | |
| 9,170,173 B2 | 10/2015 | Perron et al. | |
| 9,341,543 B2 | 5/2016 | Viswanathan | |
| 9,423,316 B2 * | 8/2016 | Perron | G01M 11/3118 |
| 9,506,838 B2 * | 11/2016 | L'Heureux | G01M 11/3118 |
| 9,546,927 B2 | 1/2017 | Hayashi | |
| 9,641,243 B2 * | 5/2017 | Perron | H04B 10/071 |
| 9,651,450 B2 * | 5/2017 | Viswanathan | G01M 11/3145 |
| 10,014,935 B2 * | 7/2018 | Perron | G01M 11/3127 |
| 10,101,240 B1 * | 10/2018 | Bonche | G01M 11/3109 |
| 10,107,714 B2 * | 10/2018 | Xu | H04B 10/071 |
| 2012/0045205 A1 | 2/2012 | Perron | |
| 2014/0146312 A1 | 5/2014 | Perron et al. | |
| 2017/0149496 A1 * | 5/2017 | Perron | G01M 11/3127 |
| 2017/0322112 A1 * | 11/2017 | Xu | H04B 10/071 |

FOREIGN PATENT DOCUMENTS

| | | |
|---|---|---|
| WO | 2011/147030 A1 | 12/2011 |
| WO | 2016/073579 A1 | 5/2016 |

OTHER PUBLICATIONS

"JDSU introduces multi-mode/single-mode OTDR with five wavelength test capability". PR newswire, Dec. 18, 2007, 2 pages.
Reunert, M., "Software tools improve fiber-optic network testing", Communication News, Feb. 2002, vol. 40, Issue 2, pp. 38-41.
Naik, S., Furse, C. M., & Farhang-Boroujeny, B.; "Multicarrier Reflectometry". Sensors Journal, IEEE, 6(3), Jun. 2006, pp. 812-818.
El-Sayed, M., Ibrahim, P. J., & Gunzer, F.; "Investigation of the precision regarding fiber fault location with a commercial Optical Time Domain Reflectometer"; High-Capacity Optical Networks and Enabling Technologies (HONET), IEEE 2010, pp. 237-241.
Acterna, "Acceptance reporting tools give fiber installers the edge in OTDR testing", Oct. 2002, 8 pages.
Jdsu, "A fully automated bi-directional OTDR data acquisition and data analysis test instrument", White paper, 2005, 6 pages.
Duwayne R. Anderson et al., "Troubleshooting Optical-Fiber Networks, Understanding and Using Your Optical Time-Domain Reflectometer", Second Edition, Elsevier Academic Press, May 2004, 114 pages.

* cited by examiner

OPTICAL TIME-DOMAIN REFLECTOMETER DEVICE INCLUDING COMBINED TRACE DISPLAY

PRIORITY

This application is a Continuation of commonly assigned and co-pending U.S. patent application Ser. No. 15/862,526, filed Jan. 4, 2018, which claims foreign priority to French Application Serial No. 1753714, filed Apr. 27, 2017, entitled "OPTICAL FIBER SENSOR INCLUDING COMBINED TRACE DISPLAY", the disclosures of which are hereby incorporated by reference in their entireties.

BACKGROUND

An optical fiber may be characterized by a sensor that injects optical pulses into the optical fiber. Based on the injected optical pulses, the sensor may extract light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the sensor include attenuation uniformity and attenuation rate, segment length, and location and insertion loss of connectors, splices, or any other optical components such as splitters or multiplexers.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
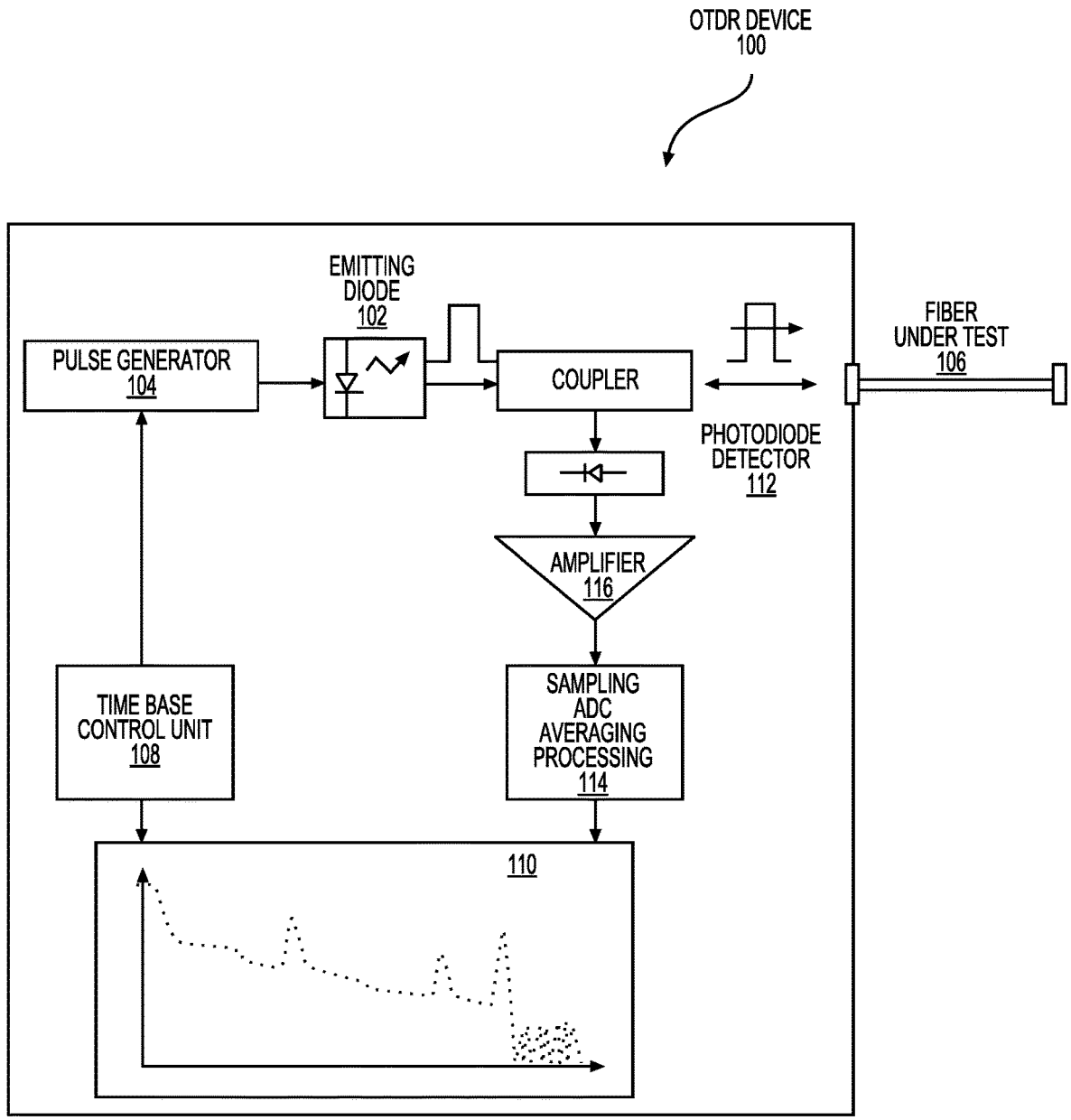
FIG. 1 illustrates an architecture of an optical time-domain reflectometer (OTDR) device, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

An optical time-domain reflectometer (OTDR) is an optoelectronic instrument used to characterize an optical fiber. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors, splices, or any other optical components such as splitters or multiplexers.

Optical networks may include topologies for which multiple pulse widths, and/or multiple pulse widths and wavelengths need to be injected, for example, by an OTDR, in order to detect and characterize optical events along the optical fiber. In this regard, an OTDR measurement may be represented by a trace showing backscattering power over the distance of the optical fiber. Each trace may be processed to localize and characterize the optical events.

When multiple acquisitions are performed by an OTDR, the number of traces displayed on a screen increases. This increases the complexity of trace analysis for a user.

In order to address at least these aspects of trace analysis, the disclosed optical time-domain reflectometer (OTDR) device provides a combined trace based on all of the multiple pulse widths, and/or multiple pulse widths and wavelengths. For example, the combined trace may include a single trace based on all of the multiple pulse widths, and/or multiple pulse widths and wavelengths. In this regard, the combined trace may include a single trace based on all of the multiple pulse widths, and/or multiple pulse widths and wavelengths. Alternatively, the disclosed OTDR device provides a reduced number of combined traces based on all of the multiple pulse widths, and/or multiple pulse widths and wavelengths. In this regard, the combined traces may include a reduced number of traces compared to the number of pulse widths, and/or pulse widths and wavelengths injected into the optical fiber.

According to an example, with respect to OTDR acquisitions using multiple pulse widths, and/or multiple pulse widths and wavelengths, the disclosed OTDR device may provide a single combined trace instead of multiple traces associated with the multiple OTDR acquisitions. The combined trace may be formed of different trace sections. For example, a trace section may be selected from any of the traces obtained for each pulse width and/or each pulse width and wavelength used during the acquisition. The trace section may also be generated based on specified processing (e.g., algorithms) as disclosed herein.

FIG. 1 illustrates an architecture of an OTDR device 100 (hereinafter referred to as "OTDR device 100"), according to an example of the present disclosure.

Referring to FIG. 1, the OTDR device 100, which may be an OTDR, may include emitting laser diode (or a plurality of emitting laser diodes) 102 to generate light by an electrical current. The emitting laser diode 102 may include a semiconductor. A pulse generator 104 may control a laser diode which sends light pulses into an optical fiber 106 under test (also designated device under test (DUT)). A time base control unit 108 may control operations of the OTDR device 100. A sensor display 110 may display measured characteristics of the optical fiber 106, for example, in the form of traces and other attributes as disclosed herein. A photodiode detector 112 may analyze the return signal from the optical fiber 106 under test to generate a signal proportional to the intensity of an optical field. A sampling ADC averaging block at 114 may be analyze the amplified return signal from amplifier 116 to generate the display at the sensor display 110.

According to examples, the emitting laser diode 102 may emit a plurality of laser beams. Each laser beam may include a different pulse width. For example, as disclosed herein with respect to FIG. 2, each laser beam may include pulse widths of 1 μs, 300 ns, 100 ns, 30 ns, and 10 ns.

The time base control unit 108 may analyze, for each laser beam, a backscattered signal from a DUT. For example, the DUT may include the optical fiber 106. The time base control unit 108 may generate, for each backscattered signal, a trace along the DUT. Further, the time base control unit 108 may generate, based on an analysis of each trace along the DUT, a combined trace that identifies optical events detected along the DUT. In this regard, the combined trace may be formed of different trace sections, where the trace sections may be selected from any of the traces obtained for each pulse width and/or each pulse width and wavelength used during the acquisition. Alternatively or additionally, the trace sections may be generated based on specific algorithms as disclosed herein. Further, the acquisitions may be based on several pulse widths and several wavelengths to provide as many combined traces as the number of wavelengths used. Moreover, for a given trace (following an acquisition for a given pulse width) a single trace section or a plurality of non-adjacent trace sections may be determined.

According to examples, the time base control unit 108 may generate, based on the analysis of each trace along the DUT, the combined trace that identifies optical events detected along the DUT by determining, for each analyzed trace along the DUT, whether a respective trace section of an analyzed trace may be included in the combined trace. Based on a determination that the respective trace section of the analyzed trace is to be included in the combined trace, the time base control unit 108 may include the respective trace section in the combined trace. Further, based on a determination that the respective trace section of the analyzed trace is to not be included in the combined trace, the time base control unit 108 may exclude the respective trace section from the combined trace.

According to examples, the time base control unit 108 may determine, for each analyzed trace along the DUT, whether the respective trace section of the analyzed trace is to be included in the combined trace by determining, for each analyzed trace along the DUT, whether the respective trace section of the analyzed trace includes an optical event. Further, based on a determination that the respective trace section of the analyzed trace includes the optical event, the time base control unit 108 may include the respective trace section in the combined trace. Thus, for a given pulse width, a trace section may be retained as soon as at least one optical event has been detected on the trace corresponding to this pulse width.

According to examples, the time base control unit 108 may determine, for a respective trace section included in the combined trace, whether a further trace section is adjacent to an optical event for the respective trace section included in the combined trace. Further, based on a determination that the further trace section is adjacent to the optical event for the respective trace section included in the combined trace, the time base control unit 108 may determine, for the combined trace, a single point that accounts for the further trace section and the optical event for the respective trace section included in the combined trace. Thus, in order to avoid any overlapping trace sections at a given point, various algorithms may be applied to determine a single point at a given position. According to various criteria (e.g., quality criteria) and for a given position, a single acquisition point may be selected on a trace section Sn and displayed to provide a single combined trace. The criteria in this regard may be derived, for example, from optical event position, event dead zone, attenuation dead zone, splitter attenuation dead zone, noise level or peak to peak noise (local noise), pulse width dynamics, etc. Further, on the overlapping area, according to quality criteria, several sub sections that are derived from initial trace sections may be generated. For a defined trace section, dedicated algorithms may be used when two trace sections are discontinuous (e.g., to join two different trace sections from two different pulse widths), or no trace section of an overlapping area meets a quality criteria. In this regard, the quality criteria may be derived, for example, from event dead zone, attenuation dead zone, splitter attenuation dead zone, noise level or peak to peak noise (local noise), optical event parameter (attenuation, reflectance, distance . . . ), pulse width dynamics, etc.

According to examples, the time base control unit 108 may determine, for each analyzed trace along the DUT, whether the respective trace section of the analyzed trace is to be included in the combined trace by determining, for each analyzed trace along the DUT, whether the respective trace section of the analyzed trace includes a plurality of optical events. Based on a determination that the respective trace section of the analyzed trace includes the plurality of optical events, the time base control unit 108 may include the respective trace section in the combined trace. Thus, for a given pulse width, a trace section may encompass the position(s) of the different events identified on the trace corresponding to the pulse width.

According to examples, the time base control unit 108 may determine, for each analyzed trace along the DUT, whether the respective trace section of the analyzed trace is to be included in the combined trace by determining, for each analyzed trace along the DUT, whether the respective trace section of the analyzed trace meets a quality criterion. Based on a determination that the respective trace section of the analyzed trace does not meet the quality criterion, the time base control unit 108 may exclude the respective trace section from the combined trace. Thus, the traces without any relevant information related to optical events may not be displayed.

According to examples, the time base control unit 108 may generate, based on the analysis of each trace along the DUT, the combined trace that identifies optical events detected along the DUT by interpolating a combined trace section between two non-adjacent combined trace sections of the combined trace to form the combined trace.

According to examples, the pulse width of one of the two non-adjacent combined trace sections may be different from the pulse width of another one of the two non-adjacent combined trace sections.

According to examples, the time base control unit 108 may reduce a length of the interpolated combined trace section by including, from an analyzed trace, an intermediate section that does not include an optical event.

According to examples, the time base control unit 108 may generate, based on the analysis of each trace along the DUT, the combined trace that identifies optical events detected along the DUT by determining, for each analyzed trace along the DUT, whether a respective trace section of an analyzed trace is to be included in the combined trace. Based on a determination that no respective trace section of the analyzed trace meets a quality criteria, the time base control unit 108 may interpolate a combined trace section where no respective trace section is included in the combined trace.

According to examples, the time base control unit 108 may generate, based on the analysis of each trace along the DUT, the combined trace that identifies optical events detected along the DUT by selecting, based on the analysis of each trace along the DUT, a plurality of trace sections from the analyzed traces. Further, the time base control unit 108 may connect the selected plurality of trace sections to generate the combined trace.

According to examples, the laser source (e.g., the emitting laser diode 102) may emit a further laser beam including a further different pulse width. The time base control unit 108 may analyze, for the further laser beam, a further backscattered signal from the DUT. Further, the time base control unit 108 may generate, for the further backscattered signal, a further trace along the DUT. The time base control unit 108 may update, based on a further analysis of the further trace along the DUT, the combined trace that identifies the optical events detected along the DUT. Thus, the combined trace may be updated after each new acquisition using a different pulse width.

Figure 4:
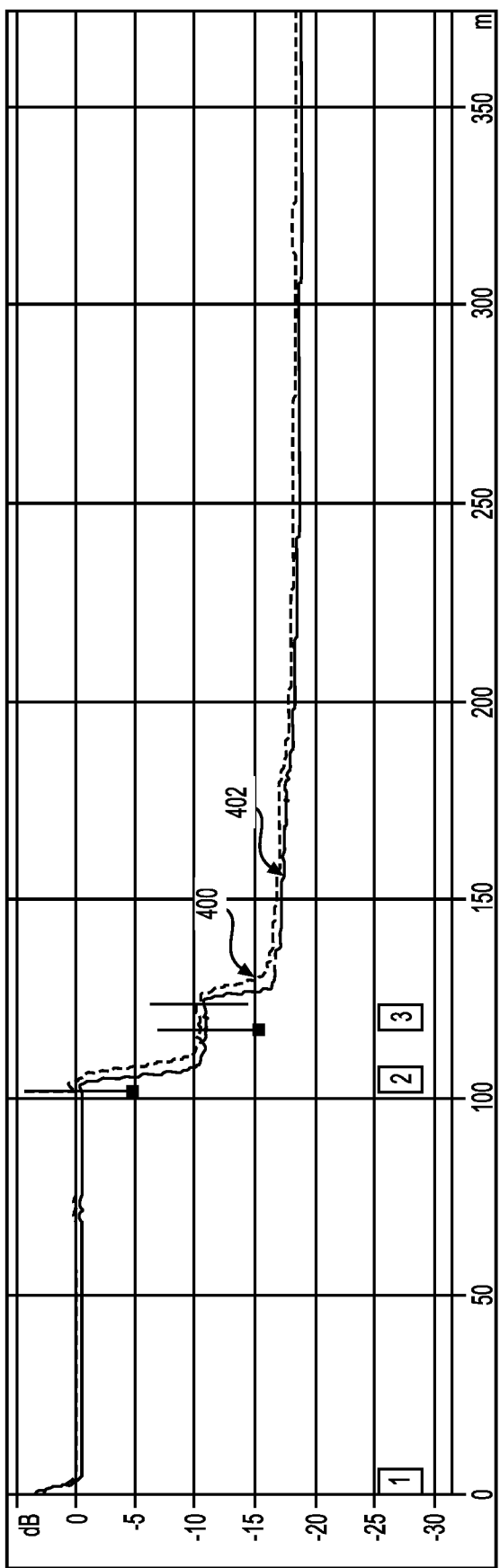
FIG. 4 illustrates a sensor display of multiple pulse acquisitions including two single combined traces with one combined trace per wavelength, according to an example of the present disclosure.

According to examples, the emitting laser diode 102 may emit a first set of a plurality of laser beams, with each laser beam of the first set including a different pulse width and a first specified wavelength (e.g., 1550 nm as disclosed herein with respect to FIG. 4). Further, the emitting laser diode 102 may emit a second set of a plurality of laser beams, with each laser beam of the second set including a different pulse width and a second specified wavelength (e.g., 1310 nm as disclosed herein with respect to FIG. 4). In this regard, the time base control unit 108 may analyze, for each laser beam of the first set and the second set, a backscattered signal from the DUT. The time base control unit 108 may generate, for each backscattered signal for the first set and the second set, a trace along the DUT. The time base control unit 108 may generate, based on an analysis of each trace along the DUT, a first combined trace that identifies optical events detected along the DUT for the first set, and a second combined trace that identifies optical events detected along the DUT for the second set.

Figure 2:
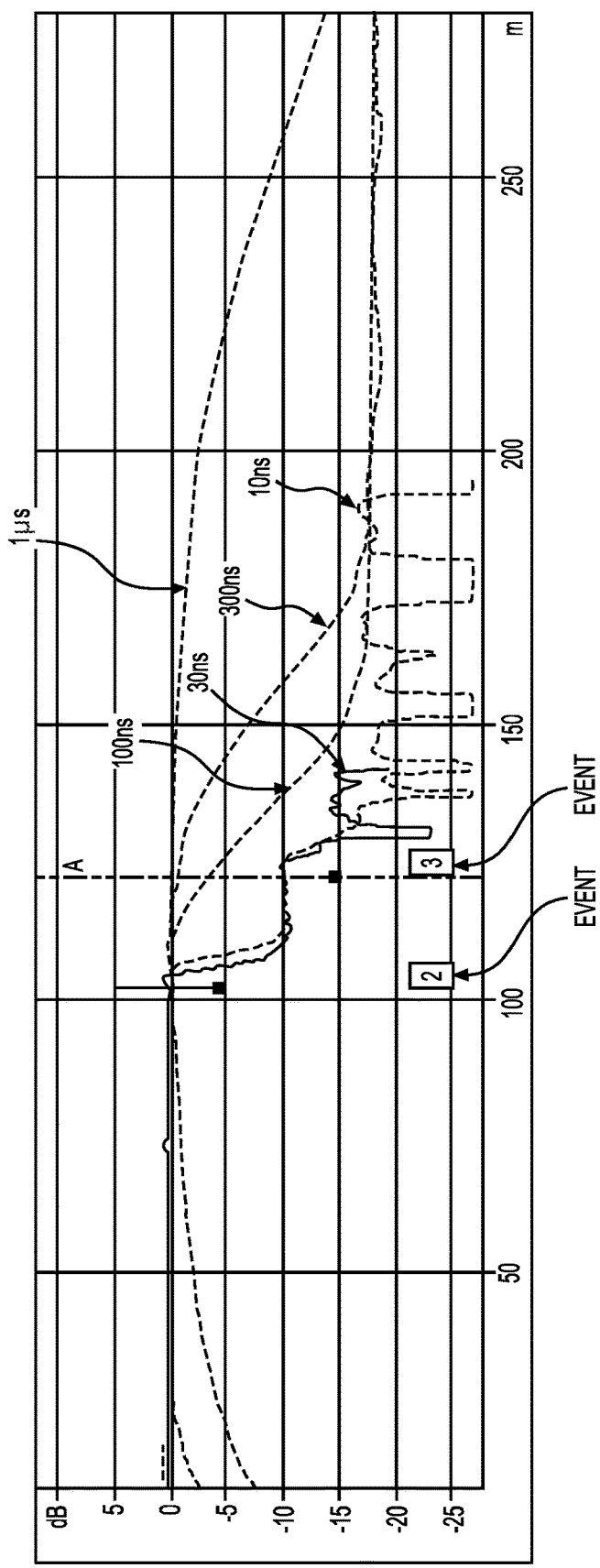
FIG. 2 illustrates a sensor display of multiple pulse acquisitions including five traces displayed for five pulses for one wavelength, according to an example of the present disclosure.

FIG. 2 illustrates a sensor display of multiple pulse acquisitions including five traces displayed for five pulses for one wavelength, according to an example of the present disclosure.

Referring to FIG. 2, the pulses may include pulse widths 1 µs, 300 ns, 100 ns, 30 ns, and 10 ns. As shown in FIG. 2, the acquisitions for pulse widths 1 µs, 300 ns, and 100 ns may taper after approximately 150 m, whereas the acquisitions for pulse widths 30 ns and 10 ns may become distorted after approximately 130 m. The events at "2" and "3" may represent various types of events along the optical fiber 106 under test, such as faults, connections, splices, etc.

Figure 3:
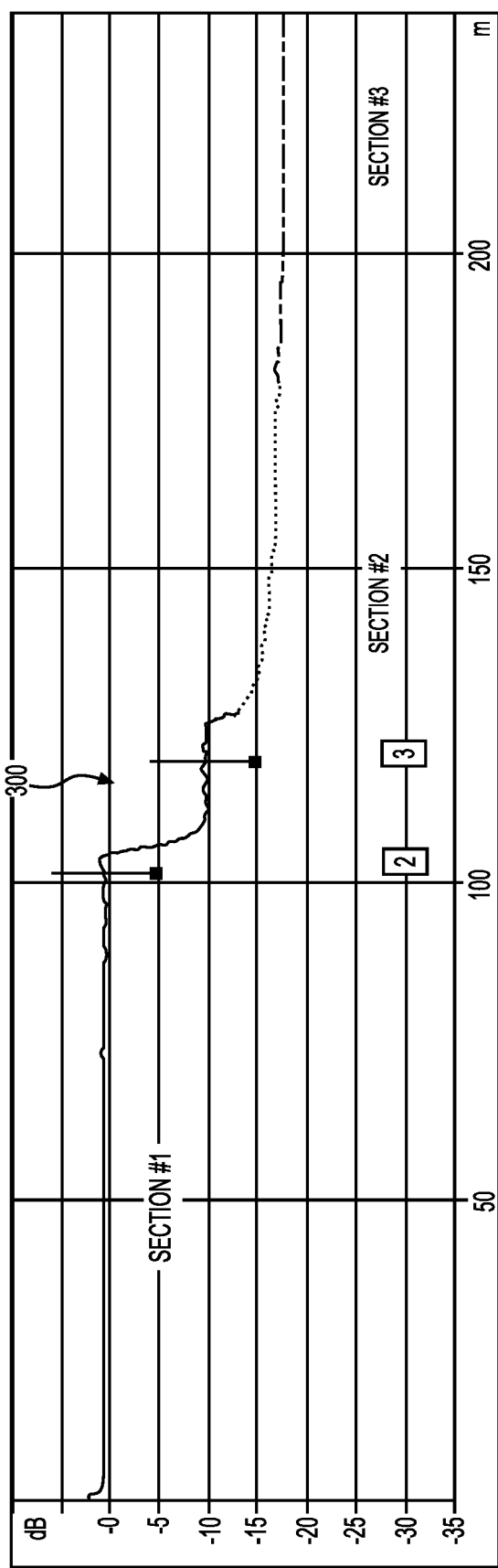
FIG. 3 illustrates a sensor display of multiple pulse acquisitions including a single combined trace generated with three trace sections for one wavelength, according to an example of the present disclosure.

FIG. 3 illustrates a sensor display of multiple pulse acquisitions including a single combined trace generated with three trace sections for one wavelength, according to an example of the present disclosure.

Referring to FIG. 3, as disclosed herein, the time base control unit 108 may generate, based on an analysis of each trace along the DUT, a combined trace that identifies optical events detected along the DUT. In this regard, the display traces for the pulse widths 1 µs, 300 ns, 100 ns, 30 ns, and 10 ns may be combined into a single combined trace 300. The single combined trace 300 may include a trace section #1, a trace section #2, and a trace section #3. Trace sections #1 and #3 may be determined (e.g., by the time base control unit 108 that operates in conjunction with the sampling ADC averaging block at 114) by selecting traces (i.e., trace portions) associated to each pulsewidth. For example, trace section #1 may be composed of the portion of the trace for the 30 ns pulse width from 0 m to approximately 120 m (e.g., including event #2 and event #3). Trace section #2 may be determined (e.g., by the time base control unit 108 that operates in conjunction with the sampling ADC averaging block at 114) by a specific algorithm, as disclosed herein. For example, trace section #2 may be determined by applying a tapering process beyond section #1 from approximately 125 m along the optical fiber (e.g., from event #3) to approximately 175 m. Further, trace section #3 may be determined from selecting a portion of the 300 ns trace from approximately 175 m to an end of the optical fiber.

FIG. 4 illustrates a sensor display of multiple pulse acquisitions including two single combined traces with one combined trace per wavelength, according to an example of the present disclosure.

Referring to FIG. 4, as disclosed herein, the emitting laser diode 102 may emit a first set of a plurality of laser beams, with each laser beam of the first set including a different pulse width and a first specified wavelength (e.g., 1550 nm). Further, the emitting laser diode 102 may emit a second set of a plurality of laser beams, with each laser beam of the second set including a different pulse width and a second specified wavelength (e.g., 1310 nm). In this regard, the time base control unit 108 may analyze, for each laser beam of the first set and the second set, a backscattered signal from the DUT. The time base control unit 108 may generate, for each backscattered signal for the first set and the second set, a trace along the DUT. The time base control unit 108 may generate, based on an analysis of each trace along the DUT, a first combined trace (e.g., at 400) that identifies optical events detected along the DUT for the first set, and a second combined trace (e.g., at 402) that identifies optical events detected along the DUT for the second set.

Thus, referring to FIG. 4, the acquisitions may be based on several pulse widths and several wavelengths to provide as many combined traces as the number of wavelengths used. The multiple pulse acquisitions may be based on nine traces displayed, with five pulses used for 1550 nm (e.g., the first set), and four pulses used for 1310 nm (e.g., the second set). For example, combined trace 400 may represent a combined trace based on five pulses (e.g., 1 μs, 300 ns, 100 ns, 30 ns, and 10 ns) used for 1550 nm, and combined trace 402 may represent a combined trace based on four pulses (e.g., 300 ns, 100 ns, 30 ns, and 10 ns) used for 1310 nm.

According to an example, the combined trace (e.g., the combined trace 300, or the combined traces 400 and 402) may be determined (e.g., by the time base control unit 108 that operates in conjunction with the sampling ADC averaging block at 114) once the second acquisition is completed, and thereafter, after each new acquisition using a different pulse width.

For example, for a Wavelength 1, the combined trace may be determined as follows:
Wavelength 1: Pulse 1->Pulse 2->Single Combined Trace->Pulse 3->Combined Trace Updated->Pulse 4->Combined Trace Updated, etc.

For a Wavelength 2, the combined trace may be determined as follows:
Wavelength 2: Pulse 1->Pulse 2->Single Combined Trace->Pulse 3->Combined Trace Updated->Pulse 4->Combined Trace Updated, etc.

As disclosed herein, the time base control unit 108 may generate, based on the analysis of each trace along the DUT, the combined trace that identifies optical events detected along the DUT by determining, for each analyzed trace along the DUT, whether a respective trace section of an analyzed trace may be included in the combined trace. Thus, based on a determination that the respective trace section of the analyzed trace is to not be included in the combined trace, the time base control unit 108 may exclude the respective trace section from the combined trace. In this regard, the traces and/or trace sections without any relevant information related to optical events may not be displayed. For example, for FIGS. 2 and 3, all traces and trace sections, other than trace section #1, trace section #2, and trace section #3, are not displayed in FIG. 3.

With respect to trace section definition (e.g., see sections #1, #2, and #3 of FIG. 3), a trace section may be defined by parameters that include a section origin, and a section length. These parameters may be expressed in distance and/or time units. Trace sections may be selected from any traces obtained for each pulse width used during an acquisition. Trace sections may also be determined by specific algorithms. For example, the specific algorithms may include interpolation algorithms that interpolate from an extremity of one trace section (e.g., see trace section #1 in FIG. 3) to an origin of another trace section (e.g., see section #3 in FIG. 3, where trace section #2 of FIG. 3 is interpolated). The interpolation may be based on best fit, averaging, etc., to provide a smooth transition between trace sections.

For a given trace (following an acquisition for a given pulse width), a single trace section or a plurality of non-adjacent trace sections may be determined (e.g., see single trace section #1 of FIG. 3). If a trace section is not useful, the trace section (or no trace sections) for a trace may be retained. For example, in FIGS. 2 and 3, no trace sections of the 10 ns trace are used to generate the combined trace.

With respect to trace section determination, examples of criteria that may be used to determine a trace section may include optical events detection at a given position, noise level, peak to peak noise measured at a given location, event dead zone, attenuation dead zone, etc. For example, in FIGS. 2 and 3, the optical events at "2" and "3" are used to determine the trace section #1. As shown in FIG. 2, the noise level (for the pulse with 10 ns) may be used to determinate the end of the section #1. The dead zone (e.g., attenuation or event dead zone) may be used to determinate the beginning of a given section. For example, as shown in FIGS. 2 and 3, the start point of the section #3 may be derived from the event dead zone from the 300 ns pulse width.

As disclosed herein, the time base control unit 108 may determine, for each analyzed trace along the DUT, whether the respective trace section of the analyzed trace is to be included in the combined trace by determining, for each analyzed trace along the DUT, whether the respective trace section of the analyzed trace includes an optical event. Further, based on a determination that the respective trace section of the analyzed trace includes the optical event, the time base control unit 108 may include the respective trace section in the combined trace. For example, for a given pulse width, a trace section may be retained as soon as at least one optical event has been detected on the trace corresponding to the pulse width. For example, in FIGS. 2 and 3, the trace section #1 may be retained based on the detection of the optical events at "2" and "3".

As disclosed herein, the time base control unit 108 may determine, for each analyzed trace along the DUT, whether the respective trace section of the analyzed trace is to be included in the combined trace by determining, for each analyzed trace along the DUT, whether the respective trace section of the analyzed trace includes a plurality of optical events. Based on a determination that the respective trace section of the analyzed trace includes the plurality of optical events, the time base control unit 108 may include the respective trace section in the combined trace. For example, for a given pulse width, the trace section may encompass the position(s) of the different events identified on the trace corresponding to the pulse width. For example, in FIGS. 2 and 3, the trace section #1 may encompass the positions of the optical events at "2" and "3".

For a given pulse width, the section may then be extended to the position of the neighboring optical events identified during the previous acquisitions. Thus, several sections may also overlap.

Figure 5:
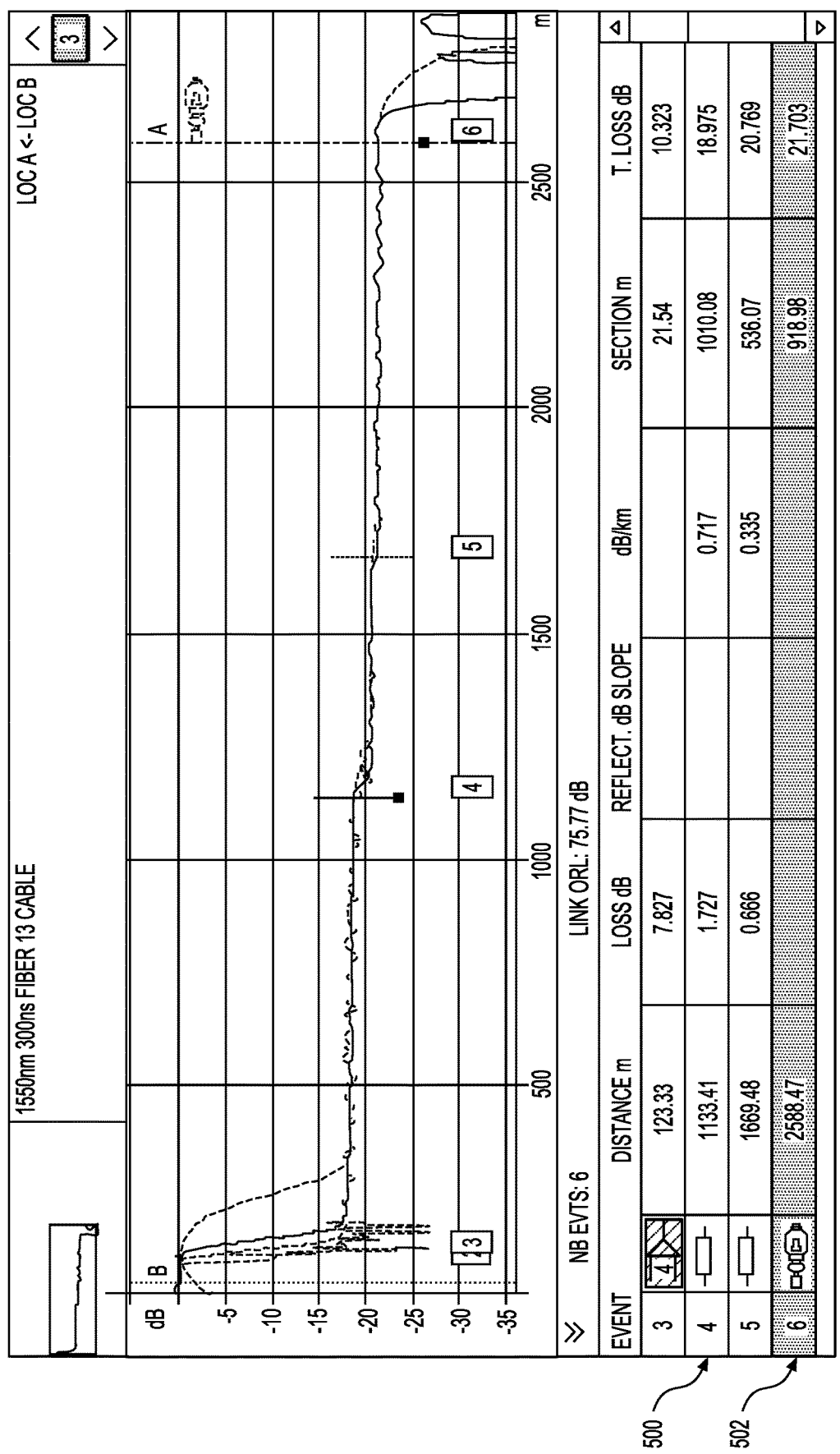
FIG. 5 illustrates a sensor display of optical events identified using a 300 ns pulse, according to an example of the present disclosure.

FIG. 5 illustrates a sensor display of optical events identified using a 300 ns pulse, according to an example of the present disclosure.

Referring to FIG. 5, optical events #4 and #6 may be identified using the 300 ns pulse. Optical event #4 and optical event #6 may represent different events as shown at 500 (e.g., a fiber connection) and 502 (a fiber end). The display of FIG. 5 may include other types of information such as the distance of an event, loss (dB) at an event, slope of the optical fiber at an event, a length of a particular section, etc.

Figure 6:
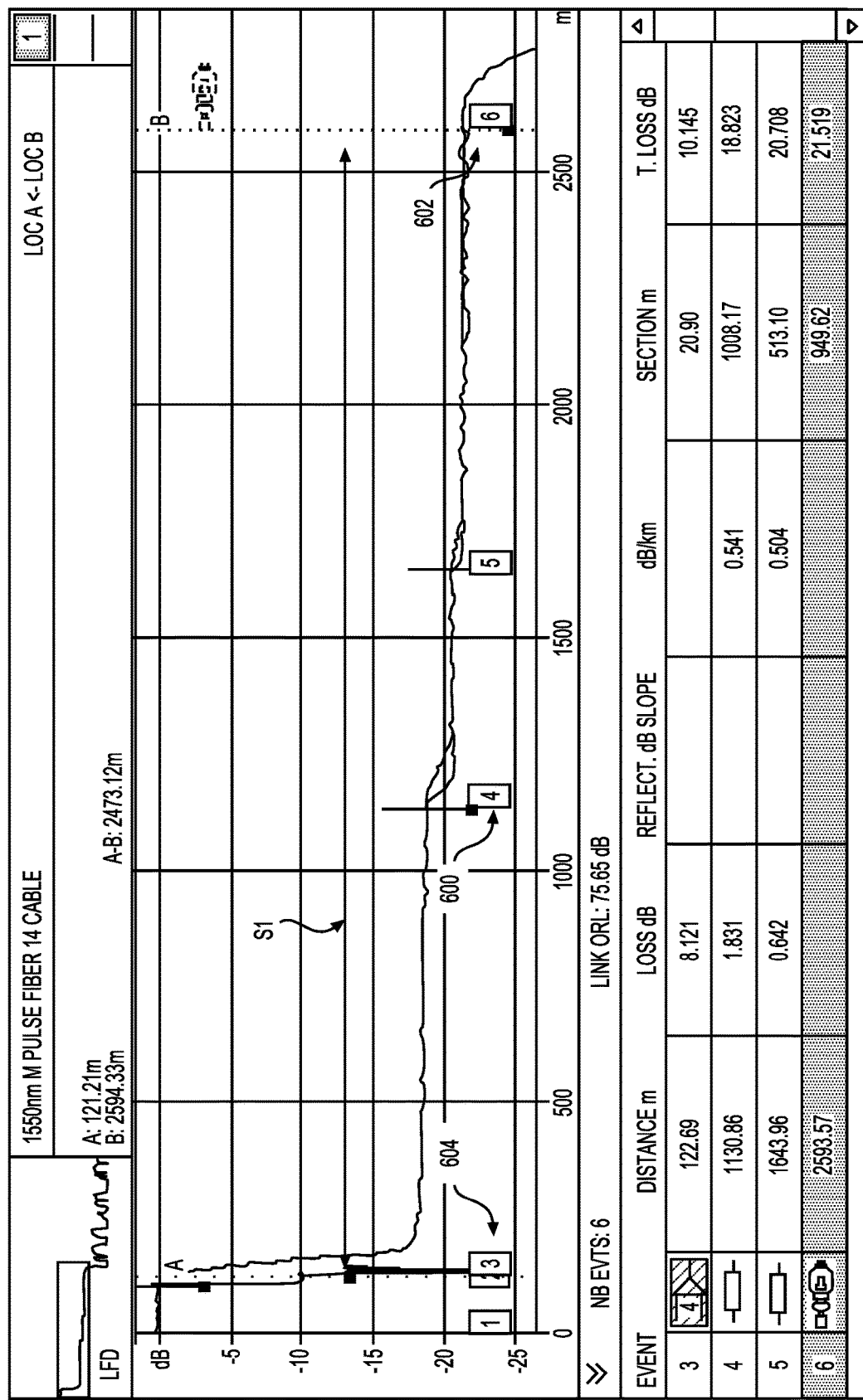
FIG. 6 illustrates a sensor display at combined trace section [S1] associated with a pulse that encompasses an event #4 and an event #6 and is extended to existing neighboring event #3, according to an example of the present disclosure.

FIG. 6 illustrates a sensor display at combined trace section [S1] associated with a pulse that encompasses an event #4 and an event #6 and is extended to existing neighboring event #3, according to an example of the present disclosure.

Referring to FIG. 6, the section [S1] associated with the pulse width of 1550 nm encompasses the event #4 at 600 and the event #6 at 602, and is extended to existing neighboring events (#3 at 604 and #6 (last optical event identified in this case)).

Figure 7:
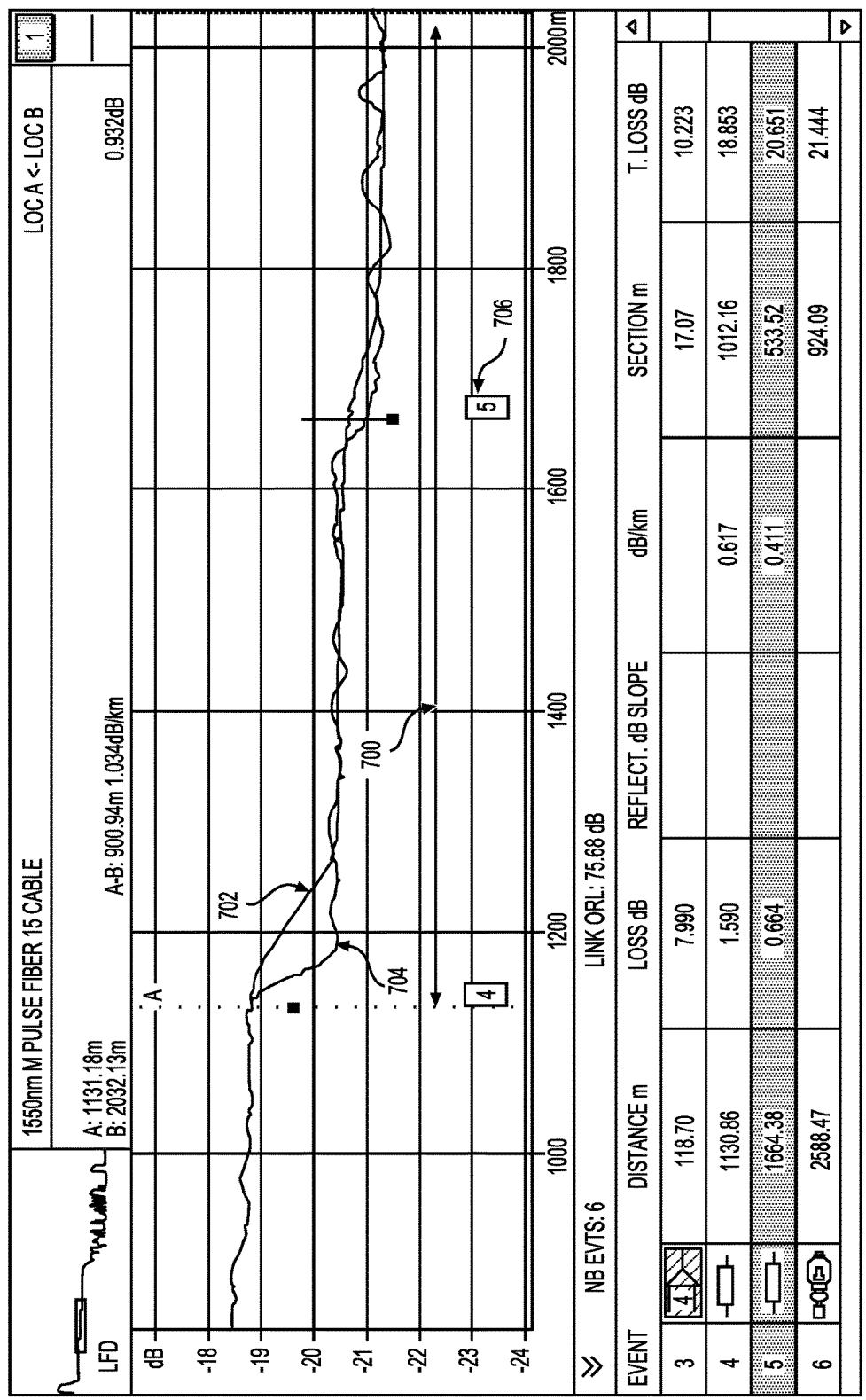
FIG. 7 illustrates a sensor display including overlapping trace sections, according to an example of the present disclosure.

FIG. 7 illustrates a sensor display including overlapping trace sections, according to an example of the present disclosure.

Referring to FIG. 7, overlapping sections are displayed between the range identified at 700. For example, the range identified at 700 includes sections for traces 702 and 704.

Figure 8:
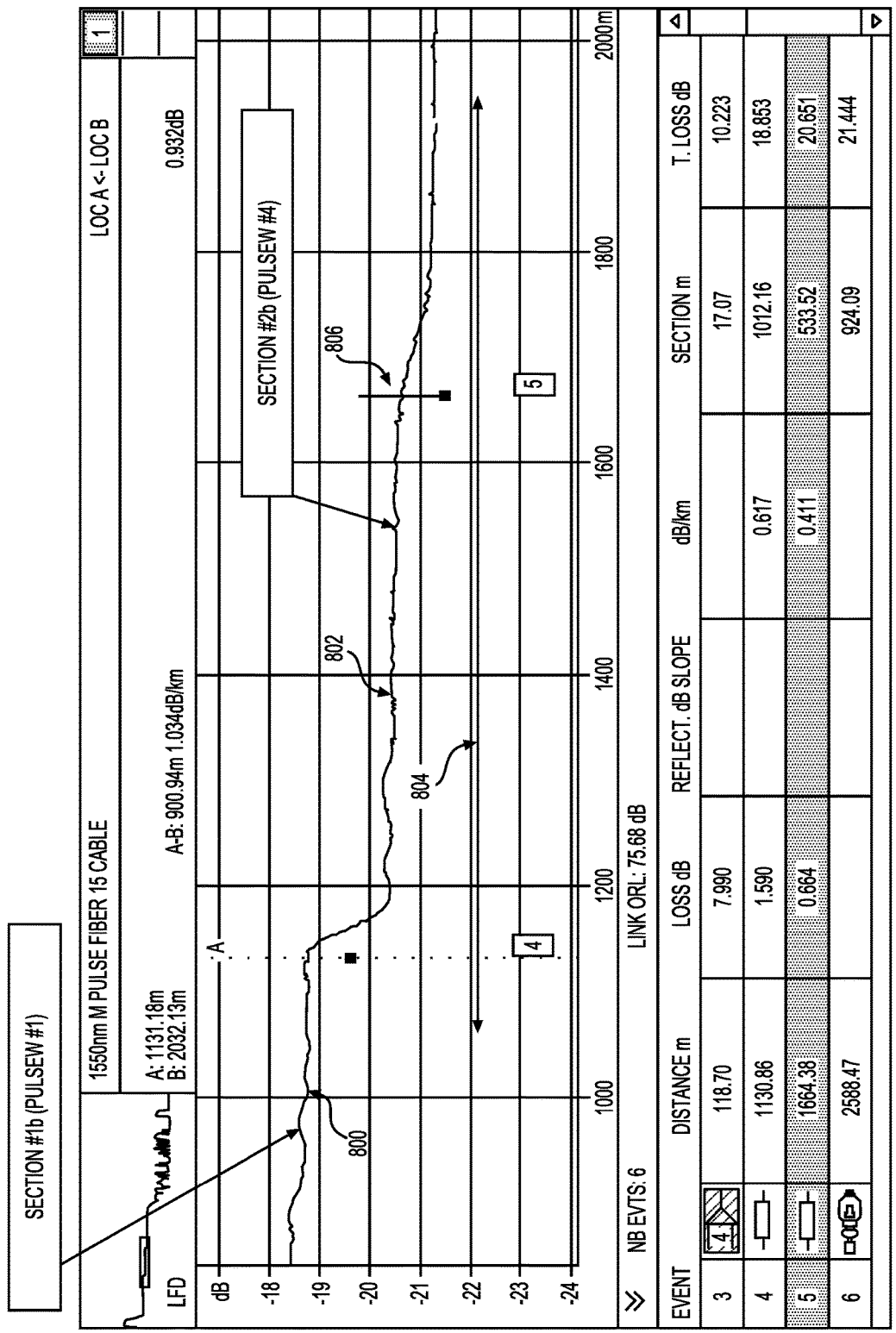
FIG. 8 illustrates a sensor display including no overlapping trace sections, according to an example of the present disclosure.

FIG. 8 illustrates a sensor display including no overlapping trace sections, according to an example of the present disclosure.

Referring to FIGS. 7 and 8, as disclosed herein, the time base control unit 108 may determine, for a respective trace section included in the combined trace, whether a further trace section is adjacent to an optical event (e.g., see optical event at 706 for traces 702 and 704) for the respective trace section included in the combined trace. Further, based on a determination that the further trace section is adjacent to the optical event for the respective trace section included in the combined trace, the time base control unit 108 may determine, for the combined trace, a single point (e.g., see corresponding single point at 806 in FIG. 8) that accounts for the further trace section and the optical event for the respective trace section included in the combined trace.

In this regard, referring to FIG. 8, section #1b (pulse width #1) is displayed at 800, and section #2b (pulse width #4) is displayed at 802. As shown at 804, the sensor display includes no overlapping trace sections. In order to avoid any overlapping trace sections at a given point (as shown in FIG. 7), various algorithms may be applied to determine a single point at a given position. For example, according to various criteria (e.g., quality criteria) and for a given position, a single acquisition point may be selected on a section Sn and displayed to provide a single combined trace. The criteria in this regard may be derived, for example, from optical event position, optical event section link, event dead zone, attenuation dead zone, splitter attenuation dead zone, peak to peak noise (local noise), noise level, pulse width used, and/or dynamics of the pulse width used. As shown in FIGS. 7 and 8, the peak to peak noise may be lower on the acquisition trace 702 than the acquisition trace 704, and thus the section trace may be derived from trace 704 and not trace 702.

Figure 9:
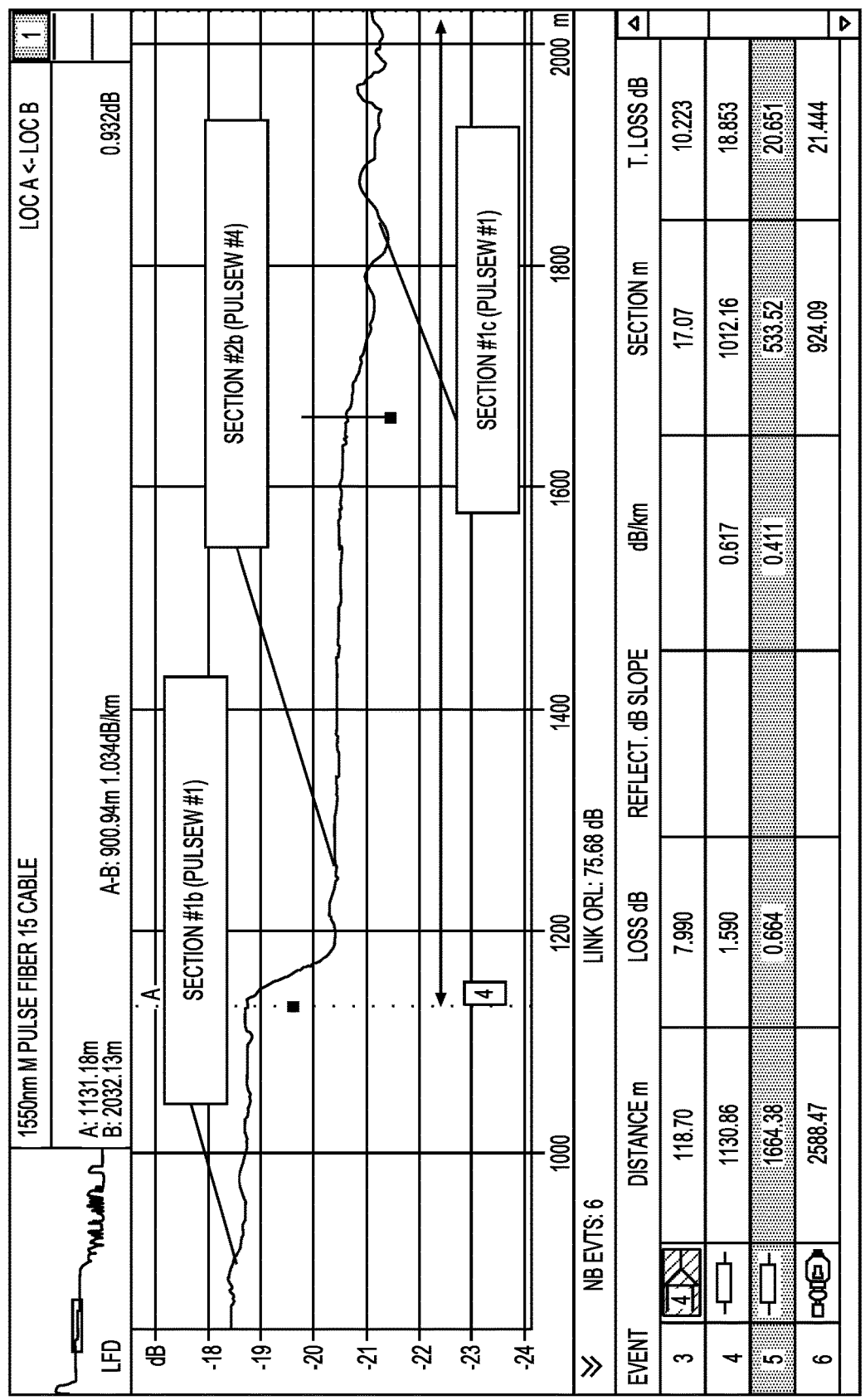
FIG. 9 illustrates a sensor display including creation of sub-sections, according to an example of the present disclosure.

FIG. 9 illustrates a sensor display including creation of sub-sections, according to an example of the present disclosure.

Referring to FIG. 9, section #1b may be based on pulse width #1, trace section #2b may be based on pulse width #4, and trace section #1c may be based on pulse width #1. In this regard, based on the overlapping area, according to quality criteria, several sub-sections that are derived from initial sections (e.g., multiple sections created from the same trace) may be generated.

Figure 10:
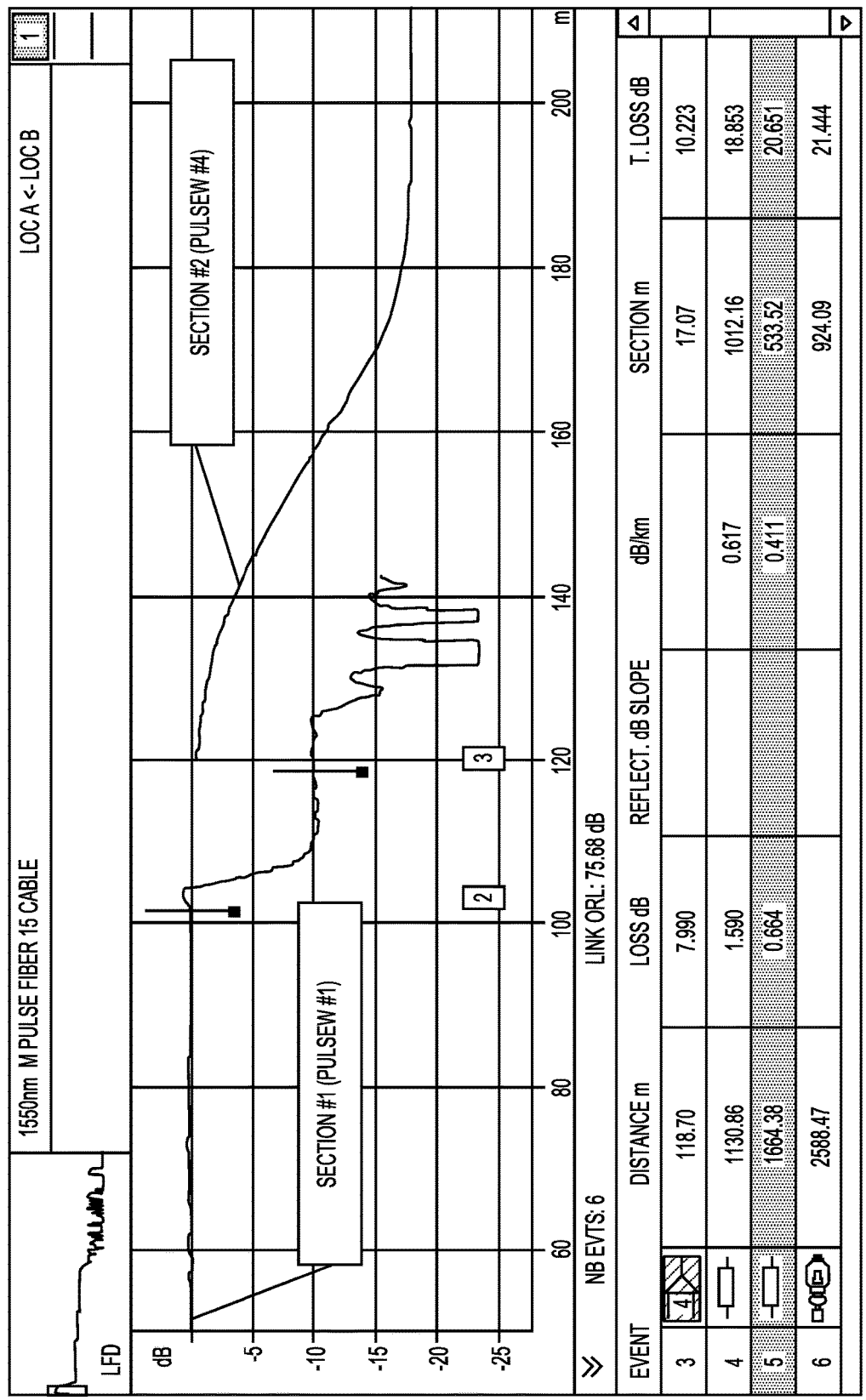
FIG. 10 illustrates a sensor display which may be used for algorithm based (e.g., interpolation based) creation of sub-sections, according to an example of the present disclosure.

FIG. 10 illustrates a sensor display which may be used for algorithm based (e.g., interpolation based) creation of sub-sections, according to an example of the present disclosure.

Referring to FIG. 10, trace section #1 may be based on pulse width #1, trace and section #2 may be based on pulse width #4. In this regard, as disclosed herein in further detail with respect to FIGS. 14-20, sections (or a section) that join trace section #1 and trace section #2 may be generated, for example, by using dedicated algorithms, if no section of the overlapping area meets the quality criteria. The algorithms may include, for example, interpolation algorithms that provide a best fit between adjacent sections.

Figure 11:
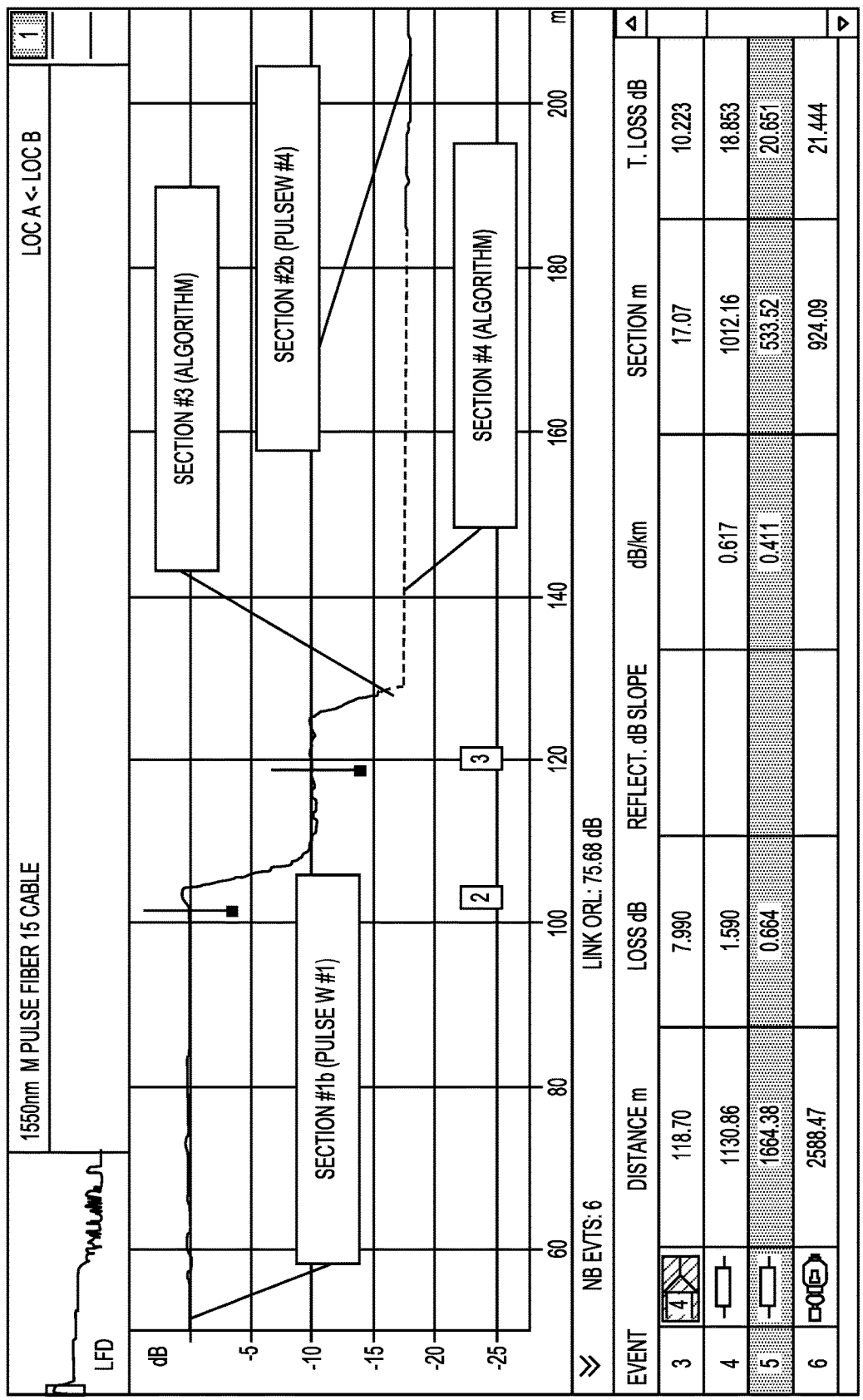
FIG. 11 illustrates a sensor display including algorithm based creation of sub-sections, according to an example of the present disclosure.

FIG. 11 illustrates a sensor display including algorithm based creation of sub-sections, according to an example of the present disclosure.

With reference to FIGS. 10 and 11, for FIG. 11, trace section #3 and trace section #4 may be generated, for example, by using dedicated algorithms, since no section of the overlapping area meets the quality criteria. As disclosed herein in further detail with respect to FIGS. 14-20, the algorithms may include, for example, interpolation algorithms that provide a best fit between adjacent sections.

Figure 12:
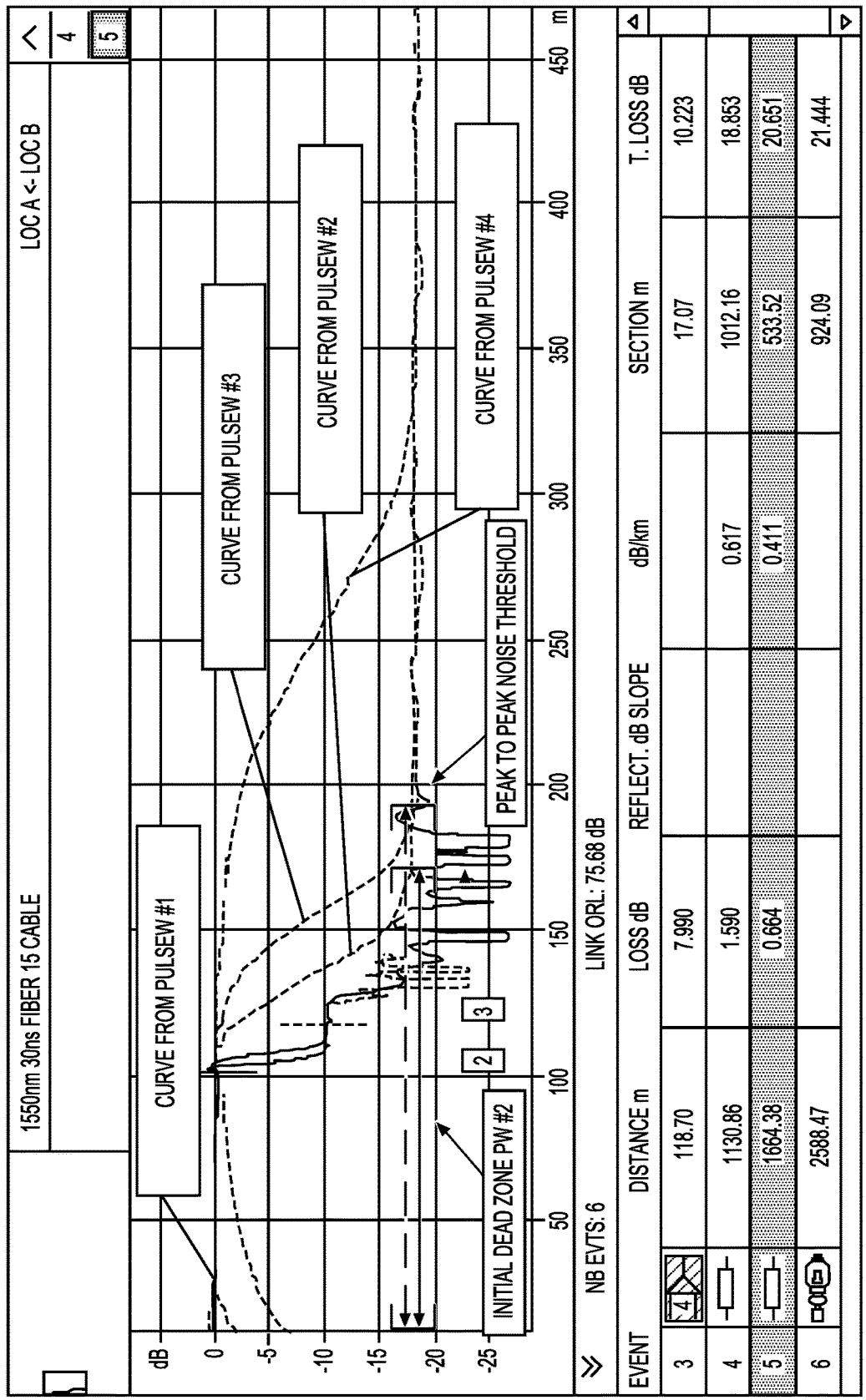
FIG. 12 illustrates a sensor display including length reduction of algorithm based sub-sections, according to an example of the present disclosure.
Figure 13:
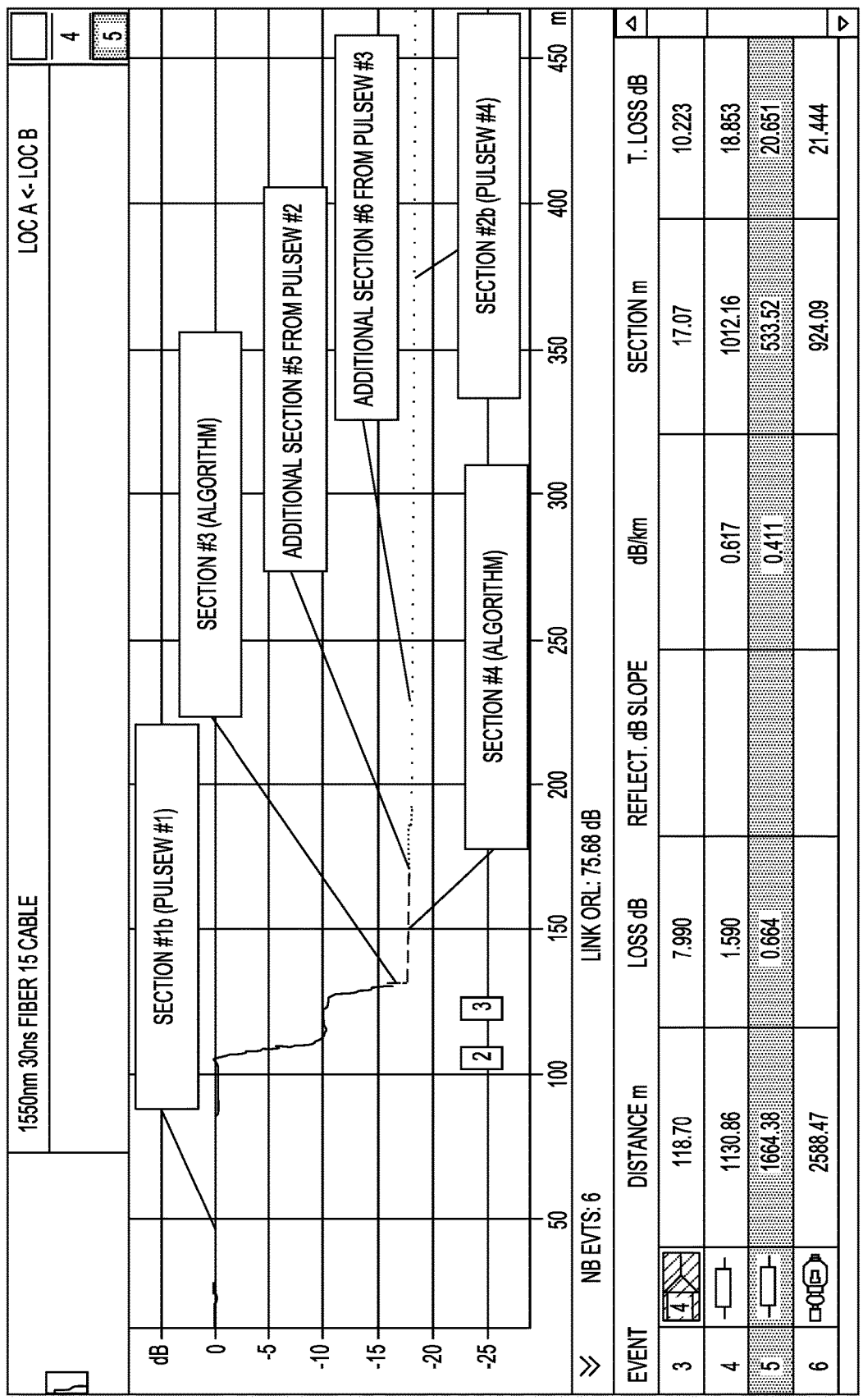
FIG. 13 illustrates a sensor display including length reduction of algorithm based sub-sections, according to an example of the present disclosure.

FIG. 12 illustrates a sensor display including length reduction of algorithm based sub-sections, according to an example of the present disclosure. Further, FIG. 13 illustrates a sensor display including length reduction of algorithm based sub-sections, according to an example of the present disclosure.

Referring to FIG. 12, in order to reduce the length of algorithm based sub-sections, additional intermediate sections may be generated from traces (e.g., curves as indicated in FIG. 12) where no optical event has been previously identified. The length of algorithm based sub-sections may be reduced, for example, using acquisition points from other (e.g., lower) pulse widths up to the initial attenuation dead zone of the given pulse width. For example, compared to FIG. 12, FIG. 13 includes section #3 that is generated from traces where no optical event has been previously found. Further, two additional sections #5 and #6 may be obtained from pulse width #2 and pulse width #3.

Figure 14:
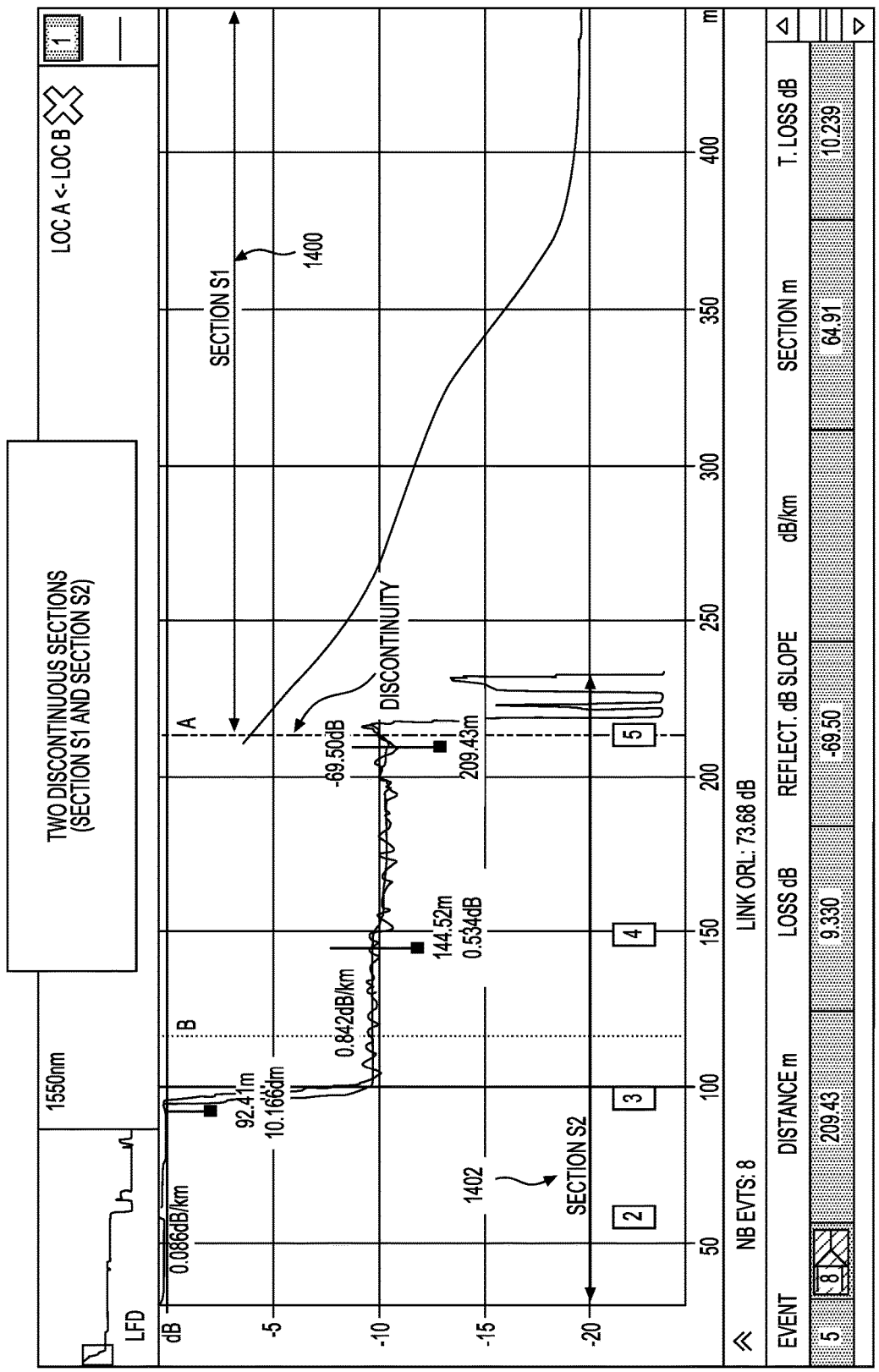
FIG. 14 illustrates a sensor display including discontinuous trace sections, according to an example of the present disclosure.

FIG. 14 illustrates a sensor display including discontinuous trace sections, according to an example of the present disclosure.

Referring to FIG. 14, as disclosed herein, the time base control unit 108 may generate, based on the analysis of each trace along the DUT, the combined trace that identifies optical events detected along the DUT by interpolating a combined trace section between two non-adjacent combined trace sections of the combined trace to form the combined trace. Additionally or alternatively, the time base control unit 108 may generate, based on the analysis of each trace along the DUT, the combined trace that identifies optical events detected along the DUT by determining, for each analyzed trace along the DUT, whether a respective trace section of an analyzed trace is to be included in the combined trace. Based on a determination that no respective trace section of the analyzed trace meets a quality criteria, the time base control unit 108 may interpolate a combined trace section where no respective trace section is included in the combined trace.

As shown in FIG. 14, in order to join two different trace sections that are based on two different pulse widths, the interpolation may be based on dedicated algorithms. The algorithms may be used when two sections are discontinuous (e.g., sections S1 and S2 as shown respectively at 1400 and 1402 in FIG. 14), and/or when no section of an overlapping area meets a quality criteria.

The quality criteria may be derived from event (e.g., optical event) dead zone, attenuation dead zone, splitter attenuation dead zone, noise level or peak to peak noise (local noise), optical event parameter (attenuation, reflectance, distance, etc.), pulse width dynamics, etc.

Figure 15:
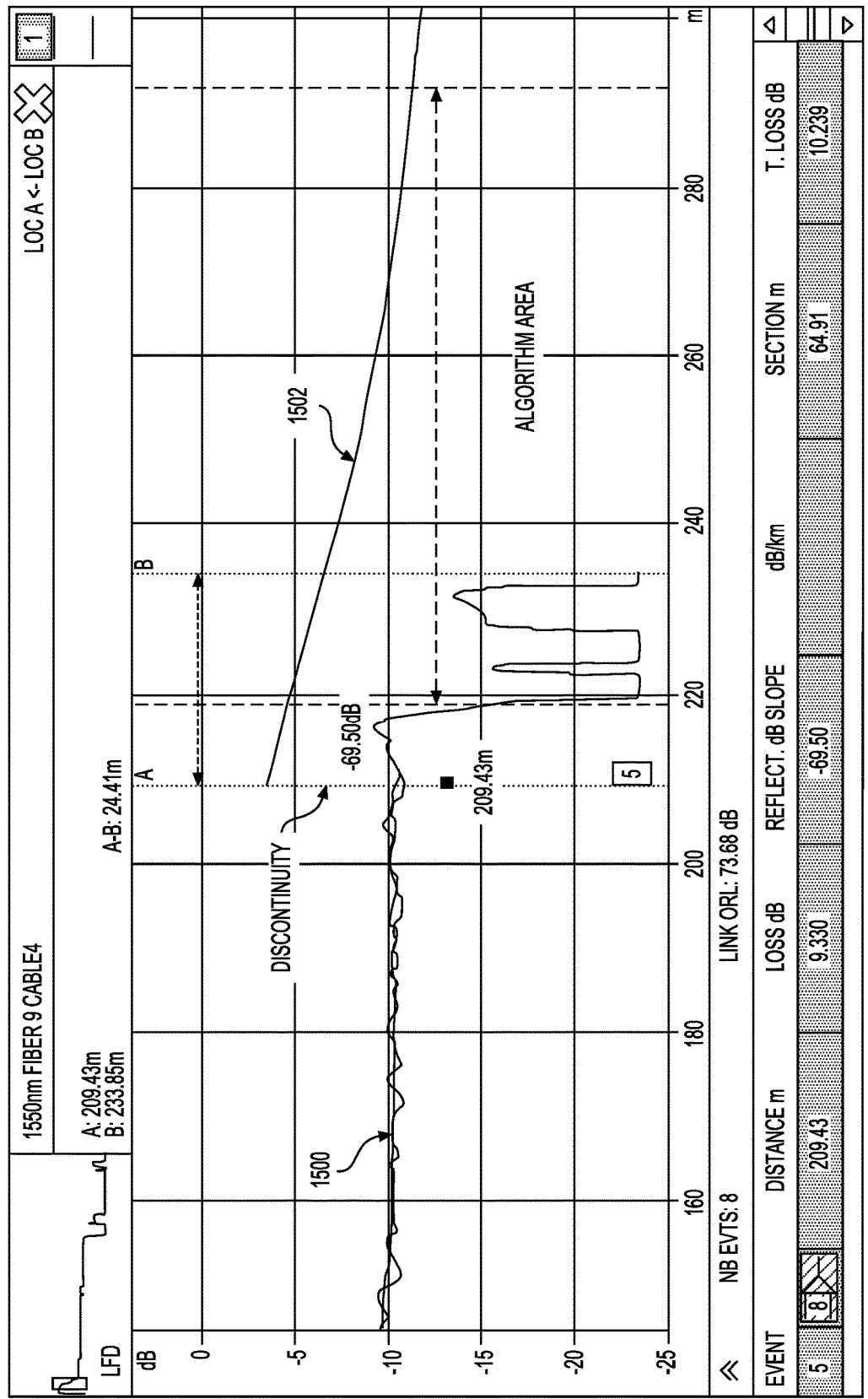
FIG. 15 illustrates a sensor display including algorithm based creation of sub-sections, according to an example of the present disclosure.

FIG. 15 illustrates a sensor display including algorithm based creation of sub-sections, according to an example of the present disclosure.

As shown in FIG. 15, the time base control unit 108 may implement algorithms to join two sections issued from a short pulse (e.g., the pulse at 1500) and a long pulse (e.g., the pulse at 1502) when the short pulse is not strong enough to reach the end of the optical network (e.g., fiber end) because of the pulse width dynamics. Alternatively or additionally, the time base control unit 108 may implement algorithms to join two sections issued from a short pulse (e.g., section S2 of FIG. 14) and a long pulse (e.g., section S1 of FIG. 14) when the long pulse is too large to be able to detect/measure the optical events (e.g., because of the initial dead zone, attenuation dead zone, splitter attenuation dead zone, etc.). The time base control unit 108 may apply algorithms to the overlap area, or may apply algorithms to an extended area that totally or partially includes the overlap area.

Figure 16:
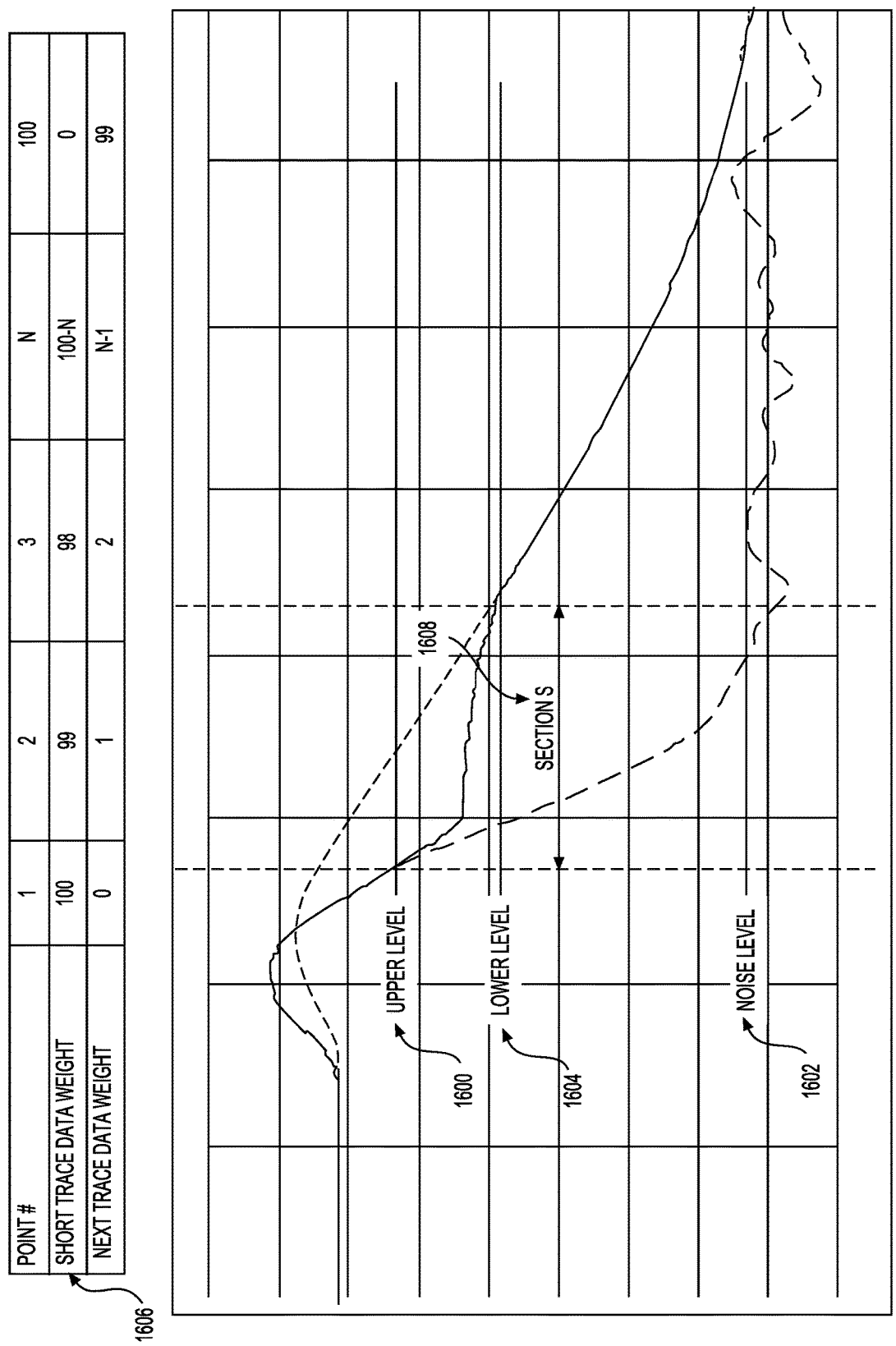
FIG. 16 illustrates a sensor display including a weighted arithmetic mean algorithm based creation of sub-sections, according to an example of the present disclosure.

FIG. 16 illustrates a sensor display including a weighted arithmetic mean algorithm based creation of sub-sections, according to an example of the present disclosure.

Referring to FIG. 16, the time base control unit 108 may apply the weighted arithmetic mean algorithm by analyzing a short pulse trace to measure the noise level (quality criteria), and define two thresholds. The first threshold may include an upper level at 1600 to be above the noise level (e.g., +6 dB for example) at 1602, and the second threshold may include a lower level at 1604 to be, for example, 2 dB under the upper level. The time base control unit 108 may determine a first point used by the weighted arithmetic mean algorithm to be the intersection point of the shorter pulse trace with the upper level threshold. Further, the time base control unit 108 may determine a last point used by the weighted arithmetic mean algorithm to be the intersection point of the larger pulse trace and the lower level threshold. The time base control unit 108 may implement an algorithm to combine the traces between these two points as a weighted average of the points of each curve, where some points contribute more than others.

For the weighted arithmetic mean algorithm, the weighting may be defined by first considering that the data from the short pulse width contribute more than the data from the long pulse width (e.g., high weight) at the beginning of the algorithm area. Further, for the weighted arithmetic mean algorithm, the weighting may be defined by further considering that the data from the long pulse width contribute more than the data from the short pulse width (e.g., high weight) at the end of the algorithm area. For example, as shown at 1606, the algorithm area may include 100 points for which the weight may be defined as shown. In this regard, the time base control unit 108 may determine the section "S" at 1608 using the weighted arithmetic mean algorithm.

Figure 17:
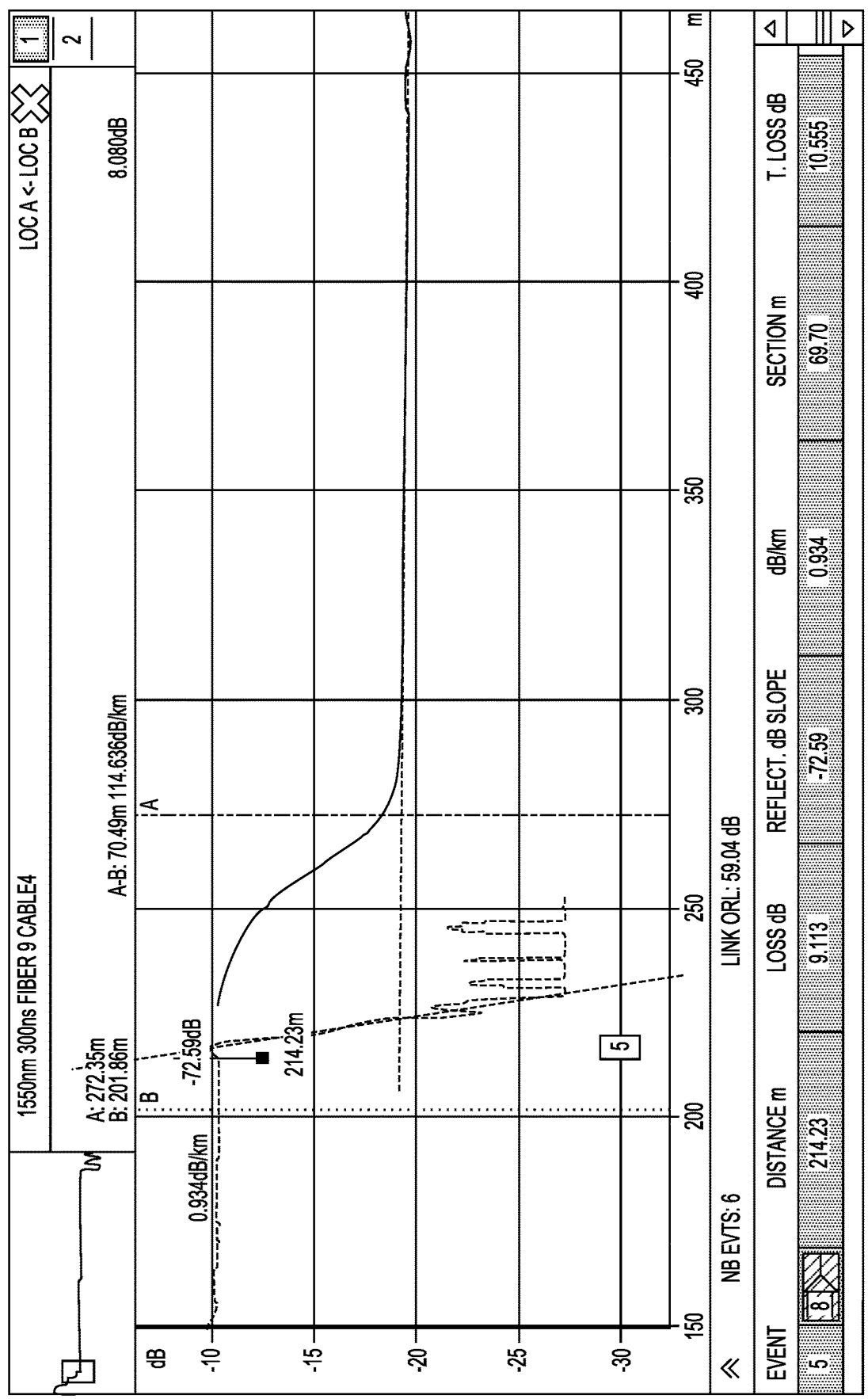
FIG. 17 illustrates a sensor display including a dual linear regression algorithm based creation of sub-sections, according to an example of the present disclosure.

FIG. 17 illustrates a sensor display including a dual linear regression algorithm based creation of sub-sections, according to an example of the present disclosure.

Referring to FIG. 17, the time base control unit 108 may implement a dual linear regression algorithm instead of the weighted arithmetic mean algorithm of FIG. 16. For the dual linear regression algorithm, the time base control unit 108 may define two slopes (e.g., one for each trace section) and determine the intersection point of these two lines. Slope determination for a given area may be based on linear regression on a pre-determined sub-section which may consider quality criteria based, for example, on optical events parameters (distance, attenuation, reflectance), attenuation, splitter attenuation dead zone, event dead zone, noise level, peak to peak noise level, etc.

Figure 18:
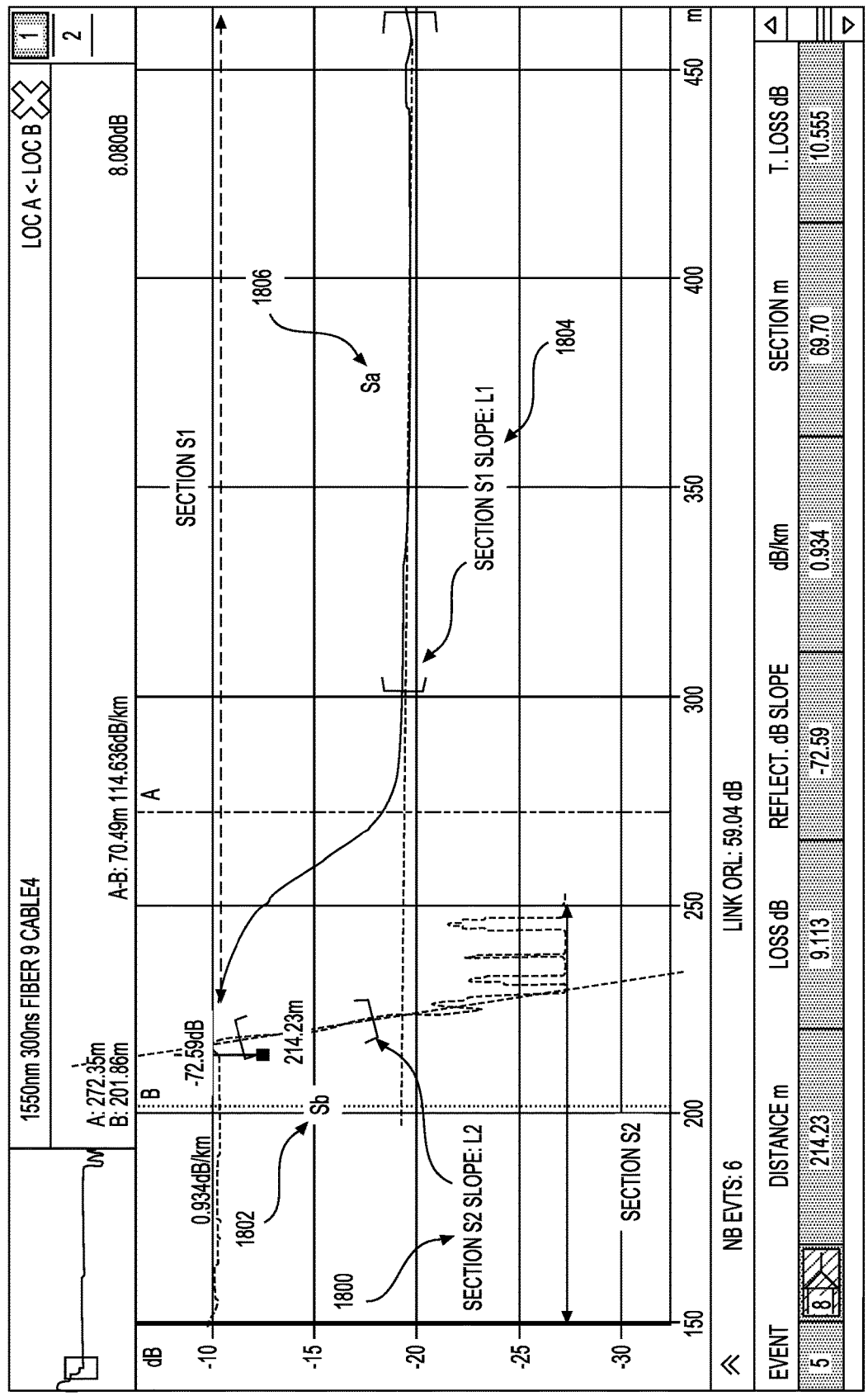
FIG. 18 illustrates a sensor display including section slopes with respect to the dual linear regression algorithm based creation of sub-sections, according to an example of the present disclosure.

FIG. 18 illustrates a sensor display including section slopes with respect to the dual linear regression algorithm based creation of sub-sections, according to an example of the present disclosure.

Referring to FIG. 18, the S2 section slope (L2) at 1800 may be the last slope determined after the "splitter" event and before the signal falls into the noise. The time base control unit 108 may determine the slope using a regression analysis with a relatively large number of points (e.g., sub-section: Sb at 1802), and implement a linear function equation: $y=a2.x+b2$.

The time base control unit 108 may determine the S1 Section slope (L1) at 1804 as the first slope after the initial dead zone with a relatively large number of points, where no optical event has been identified in a given area. The time base control unit 108 may determine the slope using a regression analysis on this given section (e.g., Sub-section: Sa at 1806), and implement a linear function equation: $y=a1.x+b1$.

The time base control unit 108 may determine, if available, the intersection point Pi (Xi, Yi) between these two lines, and each point inside the section S may be determined as follows:

$Xi=(b1-b2)/(a2-a1)$, where Xi is the coordinate of the intersection point.

If $XSb'<=x<=XPi$ then $y=a2.x+b2$

If $xPi<=x<=XSa$ then $y=a1.x+b1$.

Figure 19:
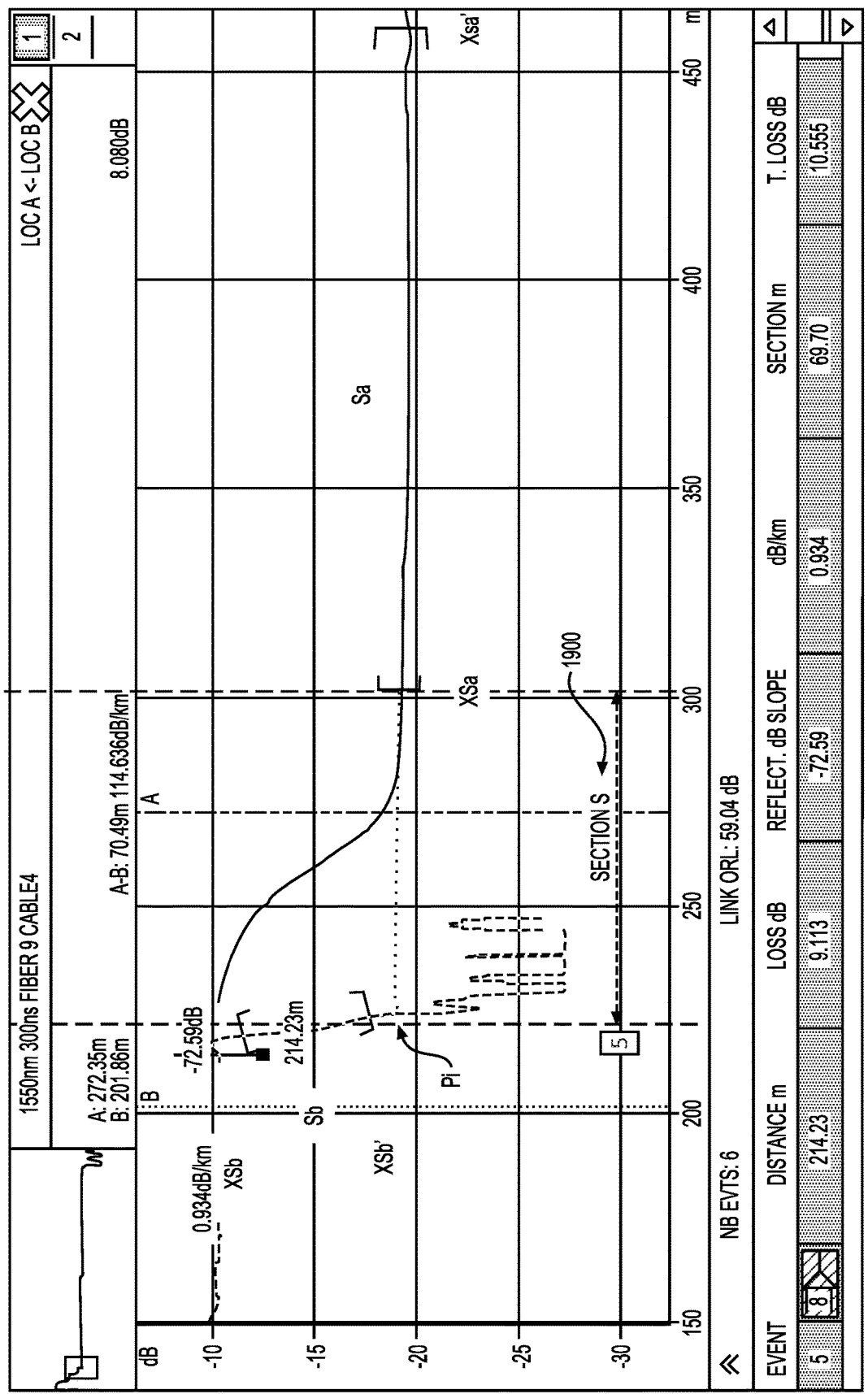
FIG. 19 illustrates a sensor display including a section [S] generated using the dual linear regression algorithm based creation of sub-sections, according to an example of the present disclosure.

FIG. 19 illustrates a sensor display including a section [S] generated using the dual linear regression algorithm based creation of sub-sections, according to an example of the present disclosure.

Referring to FIG. 19, the section [S] generated using the dual linear regression algorithm is shown at 1900.

Figure 20:
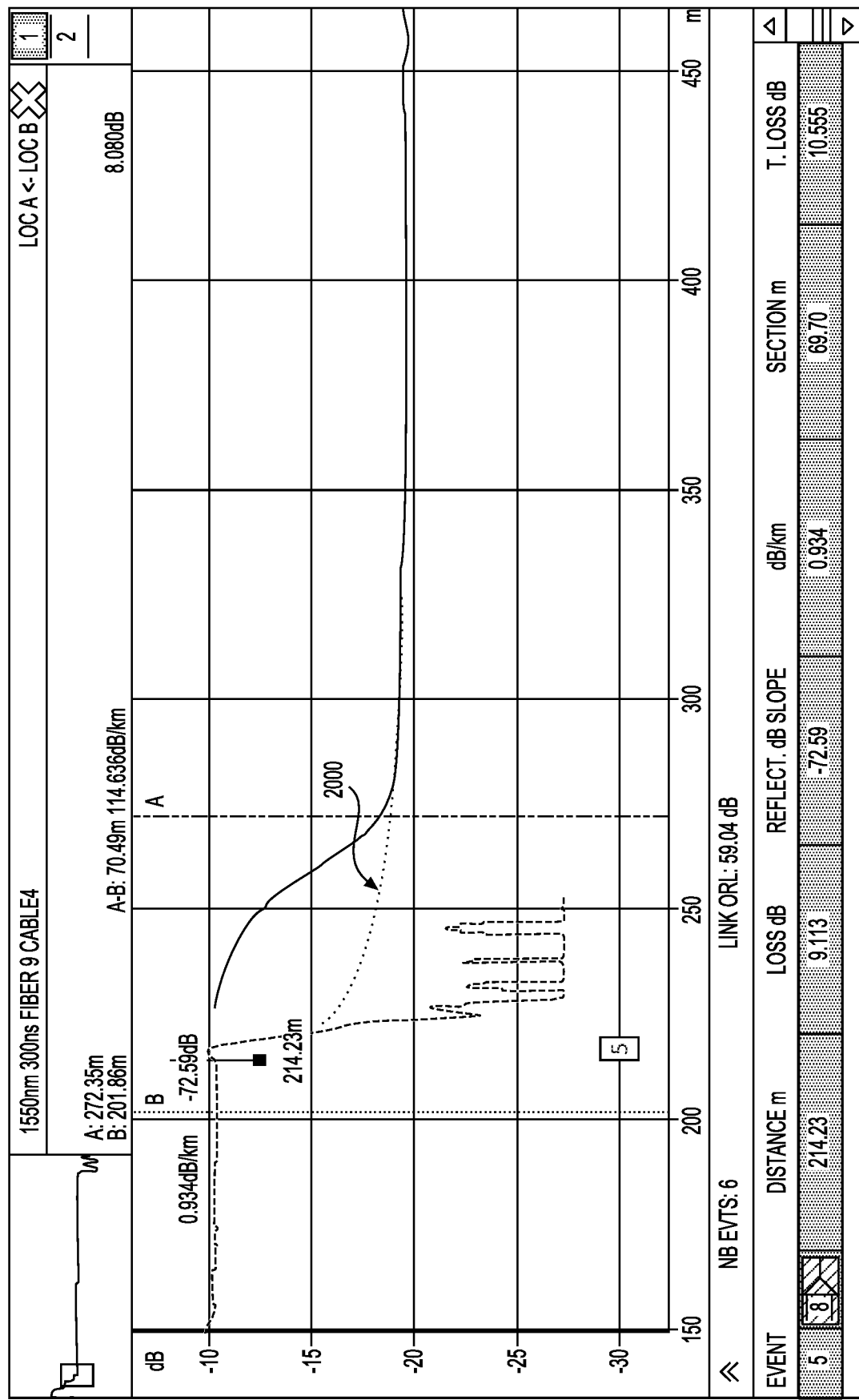
FIG. 20 illustrates a sensor display including a section [S] generated using a De Casteljau's algorithm based creation of sub-sections, according to an example of the present disclosure.

FIG. 20 illustrates a sensor display including a section [S] generated using a De Casteljau's algorithm based creation of sub-sections, according to an example of the present disclosure.

Referring to FIG. 20, as shown at 2000, the time base control unit 108 may determine the section [S] generated using a variety of other algorithms, such as polynomial regression, B-splines, quadratic Bezier curves, the De Casteljau's algorithm as shown at 2000 in FIG. 20, etc.

Figure 21:
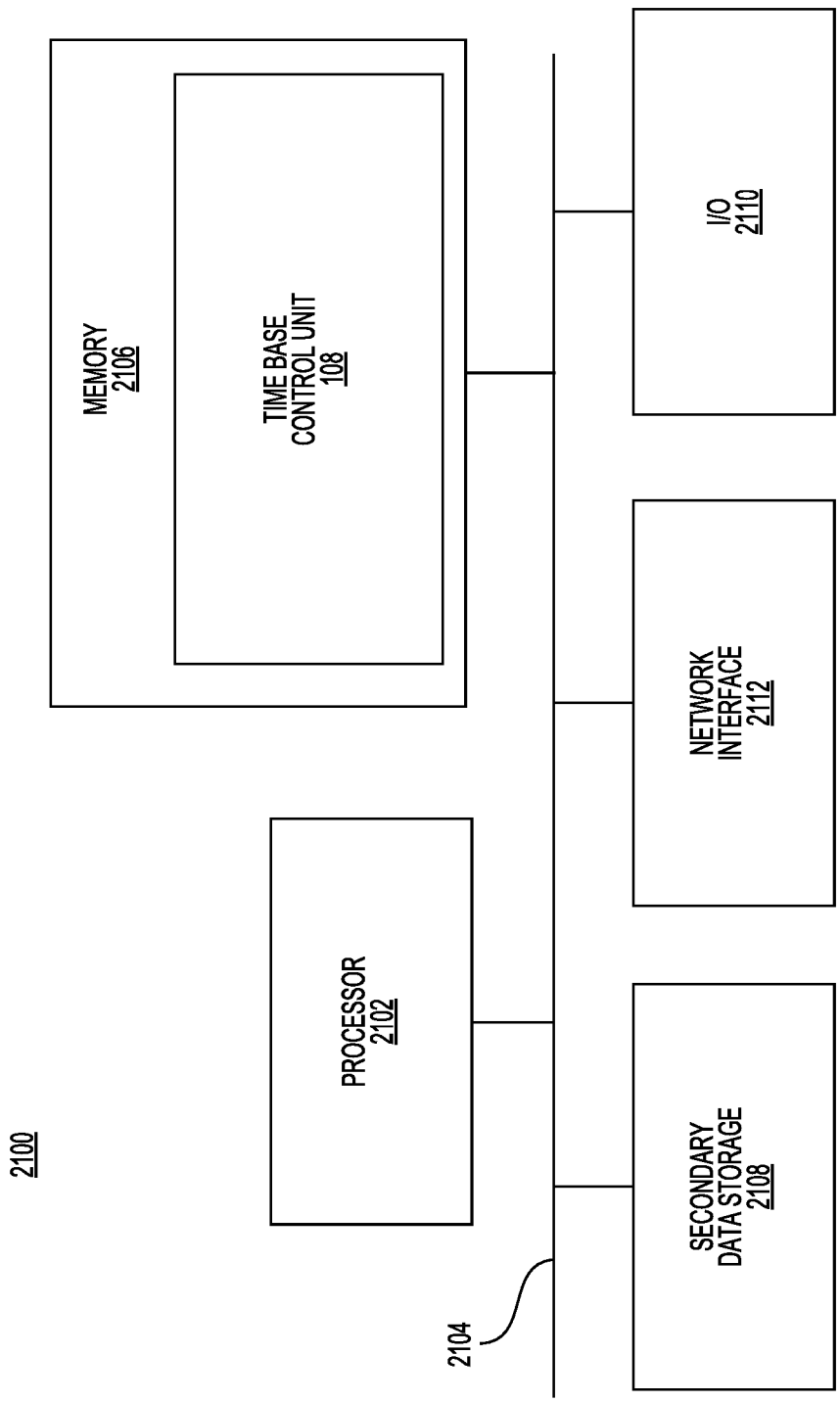
FIG. 21 illustrates a computer system, according to an example of the present disclosure.

FIG. 21 shows a computer system 2100 that may be used with the examples described herein. The computer system may represent a generic platform that includes components that may be in a server or another computer system. The computer system 2100 may be used as part of a platform for the time base control unit 108. The computer system 2100 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 2100 may include a processor 2102 that may implement or execute machine readable instructions performing some or all of the methods, functions and other processes described herein. Commands and data from the processor 2102 may be communicated over a communication bus 2104.

The computer system may also include a main memory 2106, such as a random access memory (RAM), where the machine readable instructions and data for the processor 2102 may reside during runtime, and a secondary data storage 2108, which may be non-volatile and stores machine readable instructions and data. The memory and data storage are examples of computer readable mediums. The memory 2106 may include the time base control unit 108 including machine readable instructions residing in the memory 2106 during runtime and executed by the processor 2102.

The computer system 2100 may include an I/O device 2110, such as a keyboard, a mouse, a display, etc. The computer system may include a network interface 2112 for connecting to a network. Other known electronic components may be added or substituted in the computer system.

The processor 2102 may be designated as a hardware processor. The processor 2102 may execute operations associated with various components of the OTDR device 100. For example, the processor 2102 may execute operations associated with the time base control unit 108, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An optical time-domain reflectometer (OTDR) device comprising:
   a laser source to emit a plurality of laser beams, each laser beam including a different pulse width; and
   a control unit, executed by at least one hardware processor, to:
      analyze, for each laser beam, a backscattered signal from a device under test (DUT);
      generate, for each backscattered signal, a trace along the DUT;
      generate, based on an analysis of each trace along the DUT, a combined trace that identifies optical events detected along the DUT; and reduce a length of a portion of the combined trace by including, from an analyzed trace, an intermediate section that does not include an optical event.

2. The OTDR device according to claim 1, wherein the DUT includes an optical fiber.

3. The OTDR device according to claim 1, wherein the control unit is to generate, based on the analysis of each trace along the DUT, the combined trace that identifies optical events detected along the DUT by:
   selecting, based on the analysis of each trace along the DUT, a plurality of trace sections from the analyzed traces; and
   connecting the selected plurality of trace sections to generate the combined trace.

4. The OTDR device according to claim 1, wherein
   the laser source is to emit a further laser beam including a further different pulse width, and
   the control unit is to:
      analyze, for the further laser beam, a further backscattered signal from the DUT;
      generate, for the further backscattered signal, a further trace along the DUT; and
      update, based on a further analysis of the further trace along the DUT, the combined trace that identifies the optical events detected along the DUT.

5. The OTDR device according to claim 1, wherein the control unit is to generate, based on the analysis of each trace along the DUT, the combined trace that identifies optical events detected along the DUT by:
   determining, for each analyzed trace along the DUT, whether a respective trace section of an analyzed trace is to be included in the combined trace;
   based on a determination that the respective trace section of the analyzed trace is to be included in the combined trace, including the respective trace section in the combined trace; and
   based on a determination that the respective trace section of the analyzed trace is to not be included in the combined trace, excluding the respective trace section from the combined trace.

6. The OTDR device according to claim 5, wherein the control unit is to determine, for each analyzed trace along the DUT, whether the respective trace section of the analyzed trace is to be included in the combined trace by:
   determining, for each analyzed trace along the DUT, whether the respective trace section of the analyzed trace includes a plurality of optical events; and
   based on a determination that the respective trace section of the analyzed trace includes the plurality of optical events, including the respective trace section in the combined trace.

7. The OTDR device according to claim 5, wherein the control unit is to determine, for each analyzed trace along the DUT, whether the respective trace section of the analyzed trace is to be included in the combined trace by:
   determining, for each analyzed trace along the DUT, whether the respective trace section of the analyzed trace meets a quality criterion; and
   based on a determination that the respective trace section of the analyzed trace does not meet the quality criterion, excluding the respective trace section from the combined trace.

8. The OTDR device according to claim 5, wherein the control unit is to determine, for each analyzed trace along the DUT, whether the respective trace section of the analyzed trace is to be included in the combined trace by:
   determining, for each analyzed trace along the DUT, whether the respective trace section of the analyzed trace includes an optical event; and
   based on a determination that the respective trace section of the analyzed trace includes the optical event, including the respective trace section in the combined trace.

9. The OTDR device according to claim 8, wherein the control unit is to:
   determine, for a respective trace section included in the combined trace, whether a further trace section is adjacent to an optical event for the respective trace section included in the combined trace; and based on a determination that the further trace section is adjacent to the optical event for the respective trace section included in the combined trace, determine, for the combined trace, a single point that accounts for the further trace section and the optical event for the respective trace section included in the combined trace.

10. An optical time-domain reflectometer (OTDR) device comprising:
    a laser source to emit
        a first set of a plurality of laser beams, each laser beam of the first set including a different pulse width and a first specified wavelength, and
        a second set of a plurality of laser beams, each laser beam of the second set including a different pulse width and a second specified wavelength; and
    a control unit to:
        analyze, for each laser beam of the first set and the second set, a backscattered signal from a device under test (DUT);
        generate, for each backscattered signal for the first set and the second set, a trace along the DUT;
        generate, based on an analysis of each trace along the DUT;
            a first combined trace that identifies optical events detected along the DUT for the first set, and
            a second combined trace that identifies optical events detected along the DUT for the second set; and
        reduce a length of a portion at least one of the first combined trace or the second combined trace by including, from an analyzed trace, an intermediate section that does not include an optical event.

11. The OTDR device according to claim 10, wherein the DUT includes an optical fiber.

12. A computer implemented method comprising:
    emitting a plurality of laser beams, each laser beam including a different pulse width;
    analyzing, for each laser beam, a backscattered signal from a device under test (DUT);
    generating, for each backscattered signal, a trace along the DUT;
    generating, based on an analysis of each trace along the DUT, a combined trace that identifies optical events detected along the DUT; and reducing a length of a portion of the combined trace by including, from an analyzed trace, an intermediate section that does not include an optical event.

13. The method according to claim 12, wherein the DUT includes an optical fiber.

14. The method according to claim 12, wherein generating, based on the analysis of each trace along the DUT, the combined trace that identifies optical events detected along the DUT further comprises:
    based on a determination that a respective trace section of an analyzed trace is to be included in the combined trace, including the respective trace section in the combined trace; and
    based on a determination that the respective trace section of the analyzed trace is to not be included in the combined trace, excluding the respective trace section from the combined trace.

15. The method according to claim 14, further comprising:
    determining, for each analyzed trace along the DUT, whether a respective trace section of an analyzed trace includes a plurality of optical events; and
    based on a determination that the respective trace section of the analyzed trace includes the plurality of optical events, including the respective trace section in the combined trace.

16. The method according to claim 14, further comprising:
    determining, for each analyzed trace along the DUT, whether a respective trace section of an analyzed trace meets a quality criterion; and
    based on a determination that the respective trace section of the analyzed trace does not meet the quality criterion, excluding the respective trace section from the combined trace.

17. The method according to claim 14, further comprising:
    determining, for each analyzed trace along the DUT, whether a respective trace section of an analyzed trace includes an optical event; and
    based on a determination that the respective trace section of the analyzed trace includes the optical event, including the respective trace section in the combined trace.

18. The method according to claim 17, further comprising:
    determining, for a respective trace section included in the combined trace, whether a further trace section is adjacent to an optical event for the respective trace section included in the combined trace; and
    based on a determination that the further trace section is adjacent to the optical event for the respective trace section included in the combined trace, determining, for the combined trace, a single point that accounts for the further trace section and the optical event for the respective trace section included in the combined trace.

* * * * *